US012042435B2

(12) United States Patent
Mansfield et al.

(10) Patent No.: US 12,042,435 B2
(45) **Date of Patent: *Jul. 23, 2024**

(54) TECHNIQUES FOR DETECTING A FORCE ACTING ON A BASE OF A PATIENT TRANSPORT APPARATUS

(71) Applicant: Stryker Corporation, Kalamazoo, MI (US)

(72) Inventors: Joshua Alan Mansfield, Lawton, MI (US); Chad Conway Souke, Vicksburg, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,635

(22) Filed: May 1, 2023

(65) Prior Publication Data

US 2023/0263674 A1 Aug. 24, 2023

Related U.S. Application Data

(63) Continuation of application No. 17/522,259, filed on Nov. 9, 2021, now Pat. No. 11,672,711, which is a (Continued)

(51) Int. Cl.

| | |
|---|---|
| ***A61G 1/003*** | (2006.01) |
| ***A61G 1/02*** | (2006.01) |
| ***A61G 7/10*** | (2006.01) |

(52) U.S. Cl.
CPC ............... *A61G 1/003* (2013.01); *A61G 1/02* (2013.01); *A61G 7/1046* (2013.01); (Continued)

(58) Field of Classification Search
CPC ........ A61G 1/003; A61G 1/02; A61G 1/0567; A61G 7/1046; A61G 7/1048
(Continued)

(56) References Cited

U.S. PATENT DOCUMENTS 4,403,214 A * 9/1983 Wolar .................... G08B 21/22 200/61.43
5,069,000 A 12/1991 Zuckerman
(Continued)

*Primary Examiner* — Robert G Santos
(74) *Attorney, Agent, or Firm* — Howard & Howard Attorneys PLLC

(57) ABSTRACT

A patient transport apparatus for use with a vehicle, comprising a lift mechanism between a base and a support frame to move between an extended configuration defining a first distance and a retracted configuration defining a second distance. An interface generates a user signal. A sensor generates a sensor signal corresponding to force acting on the base relative to the support frame. A controller determines if the user signal corresponds to an extend or retract command; determines if the force acting on the base has exceeded a predetermined threshold value based on the sensor signal; drives the lift mechanism toward the extended configuration where the user signal corresponds to the extend command and toward the retracted configuration where the user signal corresponds to the retract command; and interrupts driving the lift mechanism to stop motion of the lift mechanism in response to the sensor signal exceeding the predetermined threshold value.

18 Claims, 14 Drawing Sheets

Related U.S. Application Data continuation of application No. 16/671,552, filed on Nov. 1, 2019, now Pat. No. 11,197,790.

(60) Provisional application No. 62/754,757, filed on Nov. 2, 2018.

(52) U.S. Cl.
CPC ........ *A61G 7/1048* (2013.01); *A61G 2203/10* (2013.01); *A61G 2203/32* (2013.01); *A61G 2220/00* (2013.01)

(58) Field of Classification Search
USPC ................. 5/86.1, 83.1, 81.1 R, 625; 296/20
See application file for complete search history.

(56) References Cited

U.S. PATENT DOCUMENTS

| | | | | |
|---|---|---|---|---|
| 6,555,982 | B2 | 4/2003 | Tyckowski | |
| 6,677,720 | B2 | 1/2004 | Fraser | |
| 6,976,696 | B2 | 12/2005 | O'Krangley et al. | |
| 7,398,571 | B2 | 7/2008 | Souke et al. | |
| 7,690,059 | B2 | 4/2010 | Lemire et al. | |
| 7,805,784 | B2 | 10/2010 | Emire et al. | |
| 7,861,334 | B2 | 1/2011 | Lemire et al. | |
| 7,932,690 | B2 | 4/2011 | Jones et al. | |
| 7,962,981 | B2 | 6/2011 | Lemire et al. | |
| 8,393,026 | B2 | 3/2013 | Dionne et al. | |
| 8,555,433 | B2 | 10/2013 | Carletti et al. | |
| 8,701,229 | B2 | 4/2014 | Lemire et al. | |
| 8,959,681 | B2 | 2/2015 | Richards | |
| 9,126,571 | B2 | 9/2015 | Lemire et al. | |
| 9,161,871 | B2 | 10/2015 | Clement et al. | |
| 9,233,033 | B2 | 1/2016 | Valentino et al. | |
| 9,456,938 | B2 | 10/2016 | Blickensderfer et al. | |
| 9,539,156 | B2 | 1/2017 | Lemire et al. | |
| 9,555,778 | B2 | 1/2017 | Lemire et al. | |
| 9,815,439 | B2 | 11/2017 | Lemire et al. | |
| 10,098,796 | B2 | 10/2018 | Valentino et al. | |
| 10,130,528 | B2 | 11/2018 | Valentino et al. | |
| 10,406,046 | B2 | 9/2019 | Valentino et al. | |
| 10,799,403 | B2 | 10/2020 | Paul et al. | |
| 10,987,260 | B2 * | 4/2021 | Souke | A61G 1/0567 |
| 11,071,662 | B2 | 7/2021 | Derenne et al. | |
| 11,197,790 | B2 | 12/2021 | Mansfield et al. | |
| 11,666,494 | B2 * | 6/2023 | Souke | A61G 1/0567 5/611 |
| 11,672,711 | B2 * | 6/2023 | Mansfield | A61G 1/0567 5/86.1 |
| 2006/0075558 | A1 | 4/2006 | Lambarth et al. | |
| 2007/0157385 | A1 | 7/2007 | Lemire et al. | |
| 2007/0163043 | A1 | 7/2007 | Emire et al. | |
| 2007/0169268 | A1 | 7/2007 | Lemire et al. | |
| 2007/0174964 | A1 | 8/2007 | Lemire et al. | |
| 2007/0180621 | A1 | 8/2007 | Turner et al. | |
| 2009/0200977 | A1 | 8/2009 | Jones et al. | |
| 2011/0080016 | A1 | 4/2011 | Lambarth et al. | |
| 2011/0162141 | A1 | 7/2011 | Lemire et al. | |
| 2011/0231996 | A1 | 9/2011 | Lemire et al. | |
| 2011/0277242 | A1 | 11/2011 | Dionne et al. | |
| 2012/0151678 | A1 | 6/2012 | Richards | |
| 2012/0174314 | A1 | 7/2012 | Clement et al. | |
| 2012/0199405 | A1 | 8/2012 | Carletti et al. | |
| 2014/0059768 | A1 | 3/2014 | Lemire et al. | |
| 2014/0197654 | A1 | 7/2014 | Valentino et al. | |
| 2014/0237721 | A1 | 8/2014 | Lemire et al. | |
| 2014/0310876 | A1 | 10/2014 | Roussy et al. | |
| 2016/0166453 | A1 | 6/2016 | Furman et al. | |
| 2016/0193095 | A1 | 7/2016 | Roussy et al. | |
| 2016/0287454 | A1 | 10/2016 | Magill et al. | |
| 2016/0287459 | A1 | 10/2016 | Lemire et al. | |
| 2017/0035628 | A1 | 2/2017 | Naber et al. | |
| 2017/0172829 | A1 | 6/2017 | Tessmer et al. | |
| 2018/0303685 | A1 * | 10/2018 | Souke | A61G 1/0567 |
| 2018/0303689 | A1 | 10/2018 | Souke et al. | |
| 2018/0360681 | A1 | 12/2018 | Paul | |
| 2019/0201255 | A1 | 7/2019 | Paul et al. | |
| 2019/0201256 | A1 | 7/2019 | Derenne et al. | |
| 2019/0201264 | A1 | 7/2019 | Paul | |
| 2020/0138648 | A1 | 5/2020 | Mansfield et al. | |
| 2021/0186781 | A1 * | 6/2021 | Souke | A61G 1/0567 |
| 2021/0378888 | A1 | 12/2021 | Derenne et al. | |
| 2022/0062072 | A1 | 3/2022 | Mansfield et al. | |
| 2023/0263674 | A1 * | 8/2023 | Mansfield | A61G 1/0567 5/86.1 |
| 2023/0320911 | A1 * | 10/2023 | Souke | A61G 1/0567 5/611 |

* cited by examiner

TECHNIQUES FOR DETECTING A FORCE ACTING ON A BASE OF A PATIENT TRANSPORT APPARATUS

CROSS-REFERENCE TO RELATED APPLICATIONS

The subject patent application is a Continuation of U.S. patent application Ser. No. 17/522,259 filed on Nov. 9, 2021 and issued as U.S. Pat. No. 11,672,711 on Jun. 13, 2023, which is a Continuation of U.S. patent application Ser. No. 16/671,552 filed on Nov. 1, 2019 and issued as U.S. Pat. No. 11,197,790 on Dec. 14, 2021, which claims priority to and the benefit of U.S. Provisional Patent Application No. 62/754,757 filed on Nov. 2, 2018, the disclosures of each of which are hereby incorporated by reference in their entirety.

BACKGROUND

Patient support systems facilitate care of patients in a health care setting. Patient support systems comprise patient transport apparatuses such as, for example, hospital beds, stretchers, cots, tables, wheelchairs, and chairs. A conventional patient transport apparatus comprises a base and a support frame upon which the patient is supported.

Often, patient transport apparatuses have one or more powered devices to perform one or more functions on the patient support apparatus. These functions can include lifting and lowering the support frame or the base, moving a patient forward and backward, raising a patient from a horizontal position to an inclined position, or vice versa, and the like. These functions are advantageous in situations where patient transport apparatuses are loaded and unloaded into emergency response vehicles. For example, while loading a patient transport apparatus into an emergency response vehicle, an emergency responder may fix the support frame to the emergency response vehicle and lift the base toward the support frame. After the base has been lifted, the patient transport apparatus may be loaded into the emergency response vehicle. In some situations, the base of the patient transport apparatus may come into contact with an object, such as a bumper of the emergency response vehicle, while being lifted or lowered.

A patient transport apparatus designed to detect whether the base of the patient transport apparatus has come into contact with an object or will come into contact with an object is desired.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION

Referring to FIGS. 1-3B, a patient transport apparatus 20 is shown for supporting a patient in a health care and/or transportation setting. The patient transport apparatus 20 illustrated in FIGS. 1-3B includes a cot. In other embodiments, however, the patient transport apparatus 20 may include a hospital bed, stretcher, table, wheelchair, chair, or similar apparatus utilized in the transportation and care of a patient.

Figure 1:
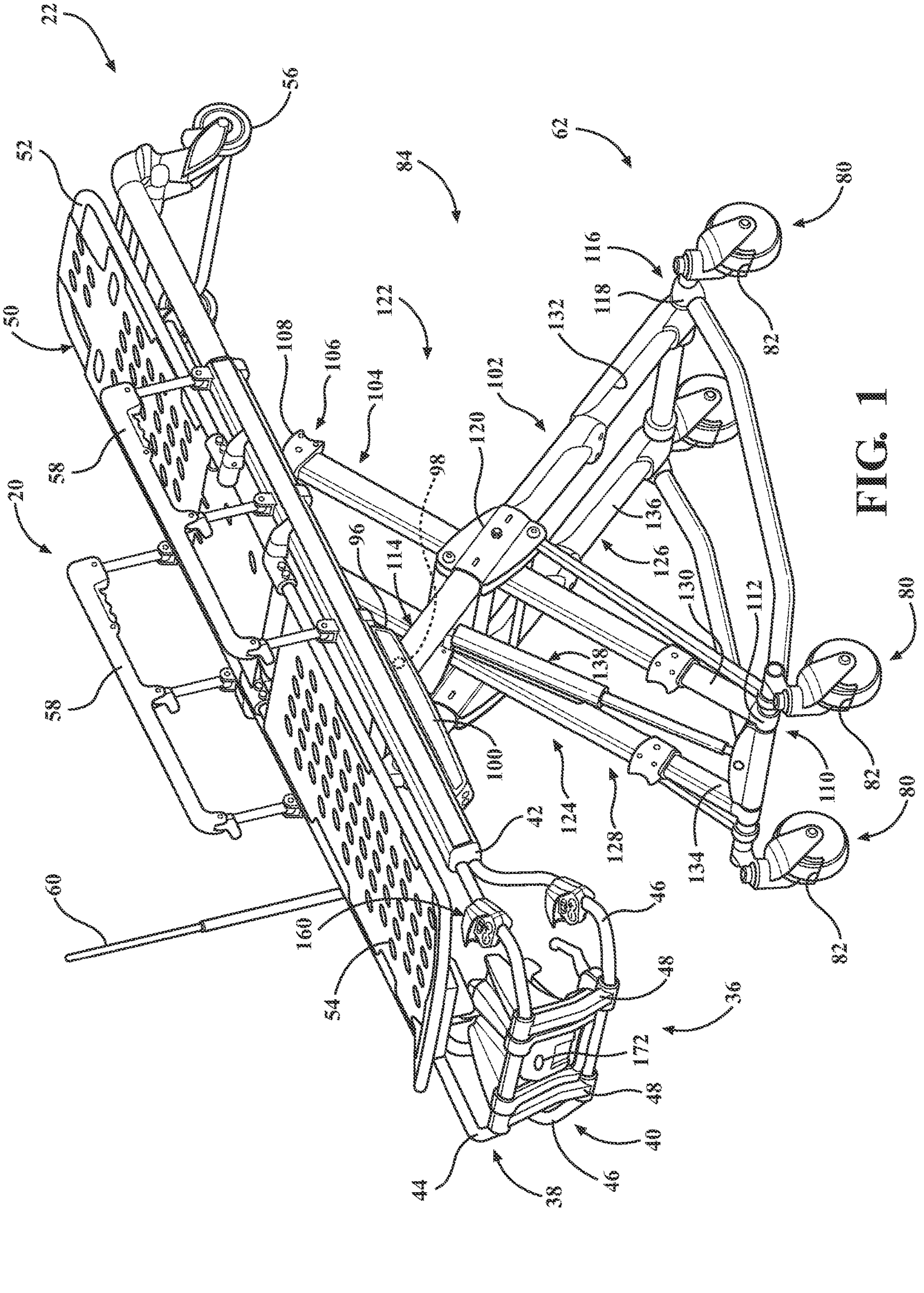
FIG. 1 is a perspective view of a patient transport apparatus.

As shown in FIG. 1, the patient transport apparatus 20 includes a support frame 22 configured to support the patient. The support frame 22 can be like that shown in U.S. Patent Application Publication No. 2018/0303689 A1, which claims priority to U.S. Provisional Patent App. No. 62/488,441, filed on Apr. 21, 2017, entitled, "Emergency Cot With A Litter Height Adjustment Mechanism," the disclosures of which are hereby incorporated by reference in its entirety.

Figure 2A:
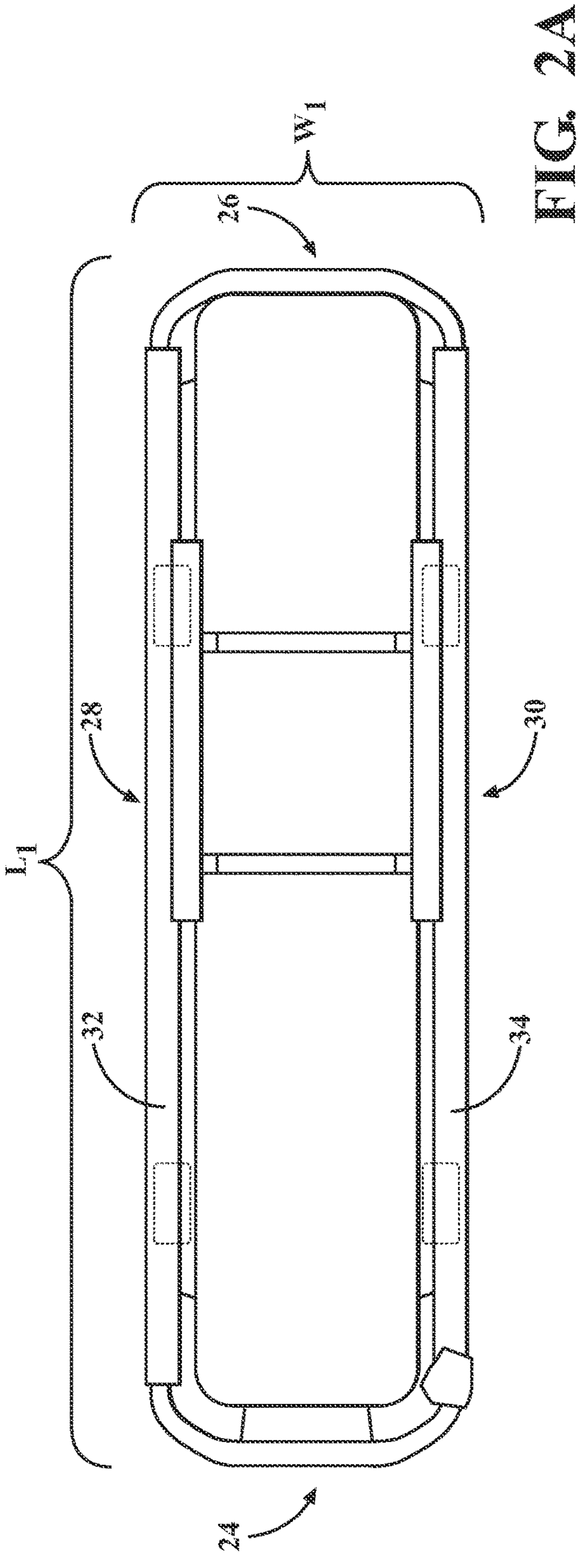
FIG. 2A is a top view of the patient transport apparatus of FIG. 1.

The support frame 22 is further illustrated from a top view of the patient transport apparatus 20 in FIG. 2A. As shown in FIG. 2A, the support frame 22 has a length $L_1$ defined extending longitudinally, and a width $W_1$ defined extending laterally, which is smaller than the length $L_1$. The support frame 22 may include two opposing lateral sides 24, 26 extending along the width $W_1$ coupled to two opposing end sides 28, 30 extending along the length $L_1$.

The support frame 22 may have various configurations and may include a variety of components. For example, in FIG. 1, end sides 28, 30 of the support frame 22 include hollow side rails 32, 34 (side rail 32 shown in FIG. 2A). In the example of FIG. 1, side 24 of the patient transport apparatus 20 includes a foot end handle 36, which may include a pair of vertically spaced U-shaped frame members 38 and 40. The frame members 38, 40 may be joined together by frame brackets 42 (only one frame bracket 42 is shown in FIG. 1), which may be telescopingly affixed inside side rails 32, 34, as illustrated in FIG. 1. A fastener or pin (not illustrated) may be utilized to facilitate a connection of the frame brackets 42 to the interior of each of the respective side rails 32, 34. Furthermore, as shown, frame member 40 may diverge from frame member 38, providing pairs of vertically spaced hand grip areas 44, 46 on frame members 38, 40, respectively. Additionally, spacer brackets 48 may be connected to opposing portions of each of the frame members 38 and 40 to maintain the vertical spacing between the hand grip areas 44 and 46.

The support frame 22 may be coupled to a variety of components that aid in supporting and/or transporting the patient. For example, in FIG. 1, the support frame 22 is coupled to a patient support surface 50, upon which the patient directly rests. The patient support surface 50 may be defined by one or more articulable deck sections, for example, a back section 52 and a foot section 54, to facilitate care and/or transportation of the patient in various patient positions.

The support frame 22 may also be coupled to loading wheels 56. As shown in FIG. 1, the loading wheels 56 may extend from the support frame 22 proximal to the back section 52 of the patient support surface 50 and may facilitate loading and unloading of the patient transport apparatus 20 from a vehicle. In one example, the loading wheels 56 may be positioned and configured to facilitate loading and unloading the patient transport apparatus 20 into an ambulance.

The support frame 22 may also be coupled to hand rails 58. In FIG. 1, the hand rails 58 extend from opposing sides of the support frame 22 and provide egress barriers for the patient on the patient support surface 50. The hand rails 58 may also be utilized by an individual, such as a caregiver, an emergency medical technician (EMT), or another medical professional, to move or manipulate the patient transport apparatus 20. In some embodiments, the hand rails 58 may include a hinge, pivot or similar mechanism to allow the hand rails 58 to be folded or stored adjacent to or below the patient support surface 50. The support frame 22 may also be coupled to a vertical support member 60. The vertical support member 60 may be configured to hold a medical device or medication delivery system, such as a bag of fluid to be administered via an IV. The vertical support member 60 may also be configured for the operator of the patient transport apparatus 20 to push or pull on the vertical support member 60 to manipulate or move the patient transport apparatus 20.

Figure 2B:
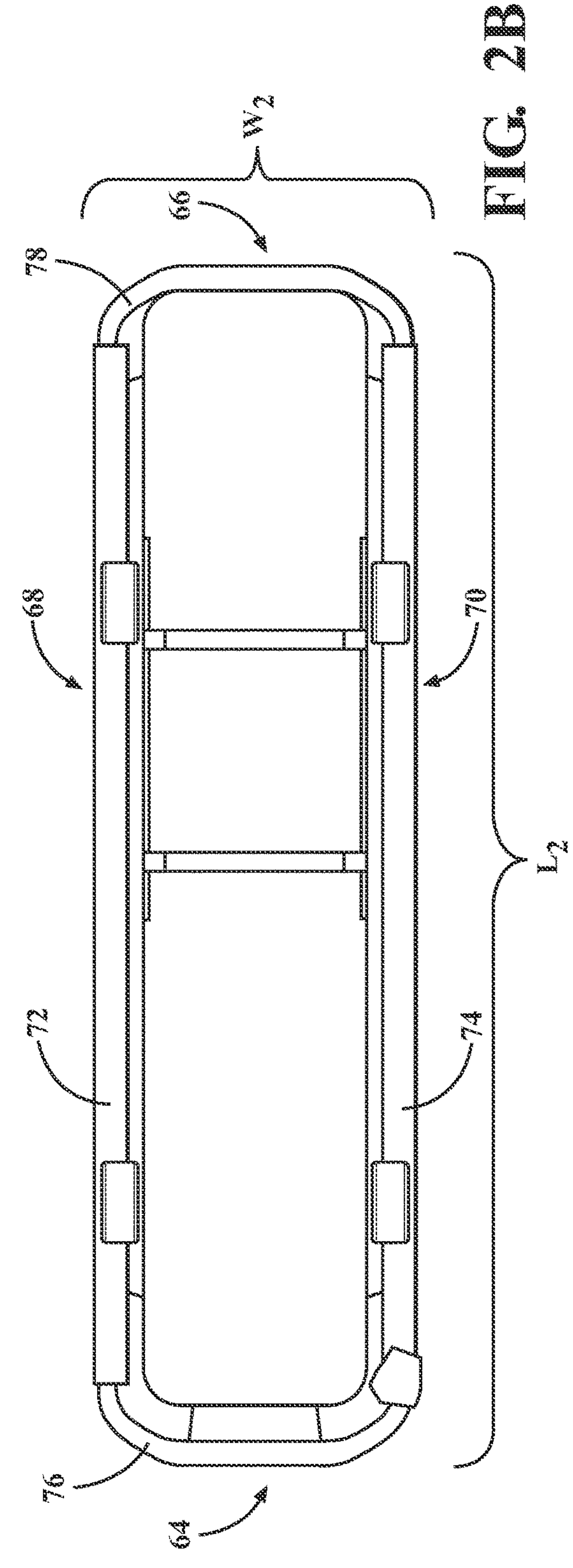
FIG. 2B is a bottom view of the patient transport apparatus of FIG. 1.

The patient transport apparatus 20 may include a base 62. As shown in FIG. 2B, the base 62 has a length $L_2$ defined longitudinally, and a width $W_2$, which is smaller than the length $L_2$. The base 62 may include two opposing lateral base sides 64, 66 extending along the width $W_2$ coupled to two opposing longitudinal base sides 68, 70 extending along the length $L_2$. As shown in FIG. 1, the longitudinal base sides 68, 70 may include longitudinally-extending rails 72, 74 and the lateral base sides 64, 66 may include crosswise-extending rails 76, 78 which may be coupled at the ends thereof to the rails 72, 74.

The base 62 may further include a plurality of caster wheel assemblies 80 operatively connected adjacent to each corner of the base 62 defined by the longitudinally-extending rails 72, 74 and the crosswise-extending rails 76, 78. As such, the patient transport apparatus 80 of FIG. 1 may include four caster wheel assemblies 80. The wheel assemblies 80 may be configured to swivel to facilitate turning of the patient transport apparatus 20. The wheel assemblies 80 may include a swivel locking mechanism to prevent the wheel assemblies 80 from swiveling when engaged. The wheel assemblies 80 may also include wheel brakes 82 to prevent rotation of the wheel.

Figure 3B:
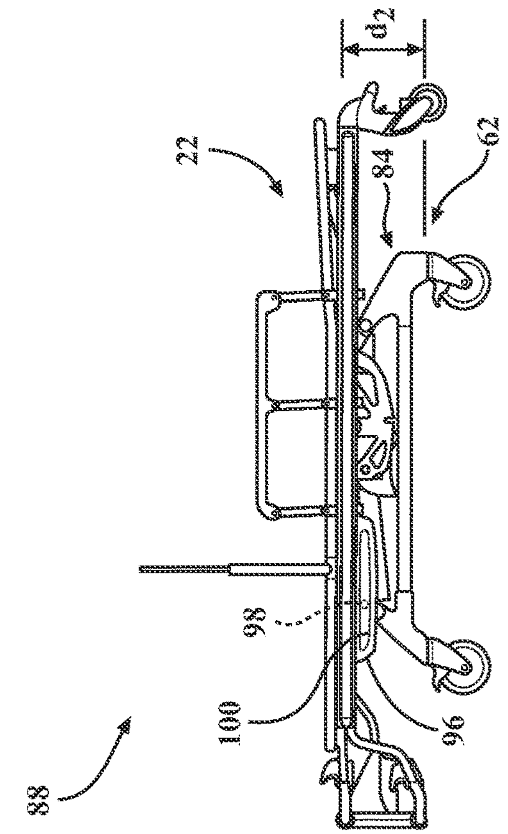
FIG. 3B is a side view of the patient transport apparatus of FIG. 1 in a retracted configuration.
Figure 3A:
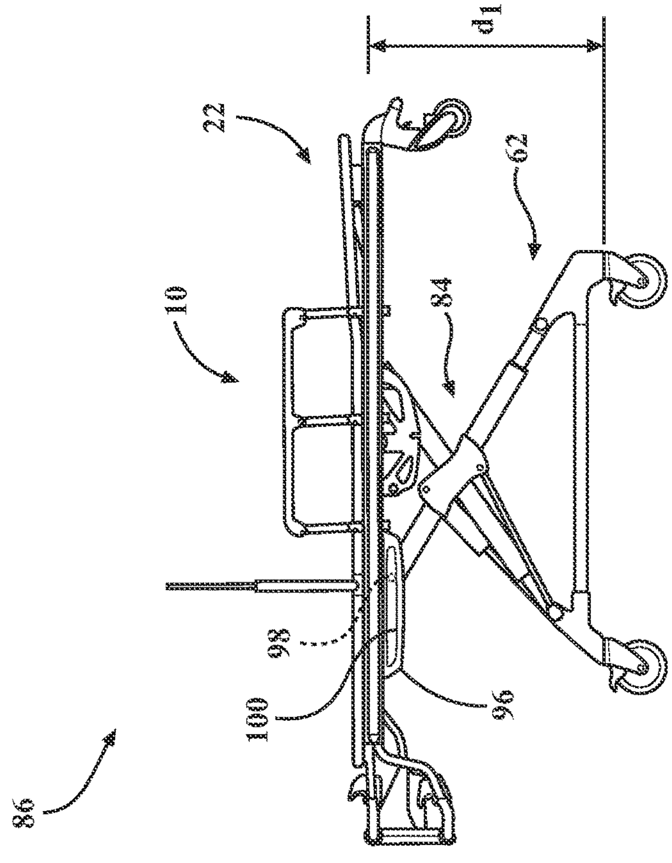
FIG. 3A is a side view of the patient transport apparatus of FIG. 1 in an extended configuration.

The patient transport apparatus 20 may also include a lift mechanism 84 interposed between the base 62 and the support frame 22. The lift mechanism 84 may be configured to move between a plurality of vertical configurations including an extended configuration 86, as shown in FIG. 3A, and a retracted configuration 88, as shown in FIG. 3B. Also shown in FIGS. 3A and 3B, the extended configuration 86 and the retracted configuration 88 are defined by a first distance $d_1$ and a second distance $d_2$. The first distance and the second distance separate the base 62 and the support frame 22 in the extended and retracted configurations 86, 88, respectively, wherein the first distance is greater than the second distance. The lift mechanism 84 can be like that shown in the U.S. Patent Application Publication No. 2018/0303689 A1.

While moving between the plurality of vertical configurations, the lift mechanism 84 may move either the base 62 or the support frame 22 relative to the other of the support frame 22 or the base 62 depending on how the patient transport apparatus 20 is supported during use. For instance, in FIGS. 3A and 3B, the patient transport apparatus 20 is supported at the support frame 22. In other instances, the patient transport apparatus 20 may be supported at the base 62. For reference, the patient transport apparatus 20 may be supported at the support frame 22 when the patient transport apparatus 20 is being unloaded/loaded into an emergency response vehicle and the patient transport apparatus 20 may be supported at the base 62 when the patient transport apparatus 20 is resting on a surface 92 (shown in FIGS. 7A-8E). In instances where the patient transport apparatus 20 is supported at the support frame 22, the lift mechanism 84, while moving between the plurality of vertical configurations, moves the base 62 relative to the support frame 22. In instances where the patient transport apparatus 20 is supported at the base 62, the lift mechanism 84, while moving between the plurality of vertical configurations, moves the support frame 22 relative to the base 62.

FIGS. 7A-8E illustrate an instance where the patient transport apparatus 20 is supported at the support frame 22 as the patient transport apparatus 20 is being loaded into/unloaded from an emergency response vehicle 90, which rests on a surface 92. As shown in FIGS. 7A-8E, the patient transport apparatus 20 includes the support frame 22, the base 62, and caster wheel assemblies 80 and is mounted to the emergency response vehicle 90 using loading wheels 56. As such, the lift mechanism 84 moves the base 62 toward the surface 92 when the lift mechanism 84 is driven toward the extended configuration 86, and away from the surface 92 when the lift mechanism 84 is driven toward the retracted configuration 88. Also shown, the emergency response vehicle 90 includes a fold-up step 94, which may be used by an emergency medical responder while loading/unloading the patient transport apparatus 20 into or from the emergency response vehicle 90.

The patient transport apparatus 20 may include a variety of components that allow the lift mechanism 84 to move between the plurality of vertical configurations. For example, in the embodiment of FIGS. 1, 3A, and 3B, the patient transport apparatus 20 includes a bracket 96 and a slidable member 98, the slidable member 98 being disposed within a channel 100 of the bracket 96 and being moveable between a plurality of different positions in the channel 100. The bracket 96 may be coupled to a variety of locations on the patient transport apparatus 20. For example, referring to the embodiment of FIGS. 1, 3A, and 3B, the bracket 96 may be coupled to the support frame 22. More specifically, in the illustrated embodiment, the bracket 96 is coupled to an underside of the side rail 34 of side 30 of the support frame 22 in FIGS. 1, 3A, and 3B. In other examples, however, the bracket 96 may be coupled to a different location on the patient transport apparatus 20. For instance, the bracket 96 may be coupled to a side of the side rail 34 which is closest to side 28. In another example, the bracket 96 may be coupled to the patient support surface 50. Furthermore, while a single bracket 96 is shown as being coupled to side 30 of the support frame 22 in FIGS. 1, 3A, and 3B, another bracket 96 may be coupled to side 28 of the support frame 22. For example, another bracket 96 may also be coupled to an underside of the side rail 32 of side 28 of the support frame 22.

The channel 100 may have various configurations and shapes, e.g., straight, zig-zag, S-shaped, curved, diagonal/sloped, or any combination thereof. For example, the channel 100 in FIGS. 1, 3A, and 3B has a linear shape. In other embodiments, the channel 100 may have a non-linear shape, a piecewise shape, a curvilinear shape, or any combination of linear or non-linear shapes. The bracket 96 and the channel 100 can be like that shown in U.S. Patent Application Publication No. 2018/0303689 A1.

As previously stated, the patient transport apparatus 20 includes a slidable member 98, which is disposed in the channel 100 and is moveable between a plurality of different positions in the channel 100. Here, as the slidable member 98 moves between the plurality of different positions within the channel 100, the lift mechanism 84 moves between the plurality of vertical configurations. In this way, each position of the slidable member 98 in the channel 100 corresponds to a vertical configuration of the lift mechanism 84. For example, in the extended configuration 86 of FIG. 3A, the slidable member 98 is positioned near a first end of the channel 100. In the retracted configuration 88 of FIG. 3B, the slidable member 98 is positioned closer to a second end of the channel 100. The slidable member assembly 98 can be like that shown in U.S. Patent Application Publication No. 2018/0303689 A1.

In FIG. 1, the lift mechanism 84 includes a first frame member 102 and a second frame member 104, both of which are coupled to the support frame 22 and the base 62. A first end 106 of the second frame member 104 may be pivotally coupled to the head-end of the support frame 22 at a connection point 108 such that the second frame member 104 may pivot about the connection point 108. A second end 110 of the second frame member 104 may be pivotally coupled to a foot-end of the base 62 at a connection point 112 such that the second frame member 104 may pivot about the connection point 112. Furthermore, a first end 114 of the first frame member 102 may be pivotally coupled to a foot-end of the support frame 22 via the slidable member 98. More specifically stated, and as shown in FIG. 1, the first end 114 may be pivotally coupled to the slidable member 98, which is disposed in the channel 100 of the bracket 96, which is coupled to the support frame 22.

As such, the first frame member 102 is pivotally coupled to the support frame 22 and may pivot about the slidable member 98. Also shown, a second end 116 of the first frame member 102 may be pivotally coupled to a head-end of the base 62 at a connection point 118 such that the first frame member 102 may pivot about the connection point 118. Furthermore, the first frame member 102 and the second frame member 104 may be pivotally coupled to each other at the pivot axle 120 to form an "X" frame 122.

The lift mechanism 84 may include a second, similarly constructed X frame 124, which may include a third frame member 126 and a fourth frame member 128. Similar to X frame 122, the third frame member 126 and the fourth frame member 128 of X frame 124 may be pivotally coupled to a side of the support frame 22 and a side of the base 62. For example, the third frame member 126 and the fourth frame member 128 of X frame 124 may be pivotally coupled to a side of the support frame 22 and a side of the base 62, which oppose a side of the support frame 22 and a side of the base 62 to which the first frame member 102 and the second frame member 104 are coupled. In one such embodiment, as shown in FIG. 1, X frame 124 is coupled to side 28 of the support frame 22 and to side 68 of the base 62, and X frame 122 is coupled to side 30 of the support frame 22 and to side 70 of the base 62. It will be appreciated that any reference herein to the first frame member 102 may also be a reference to the third frame member 126. Similarly, any reference to the second frame member 104 may also be a reference to the fourth frame member 128.

In FIG. 1, the frame members 102, 104, 126, 128 are hollow and telescopingly include further frame members 130, 132, 134, 136, respectively. Further frame members 130, 132, 134, 136 are supported for movement into and out of the respective frame members 102, 104, 126, 128 to extend a length of the respective frame members 102, 104, 126, 128. In the embodiment shown in FIG. 1, the further frame members 130, 132, 134, 136 extend out of frame members 102, 104, 126, 128 toward the base 62. However, in other examples, the further frame members 130, 132, 134, 136 may extend out of frame members 102, 104, 126, 128 toward the support frame 22. In these examples, frame members 102, 104, 126, 128 are coupled to the base 62 or the support frame 22 via further frame members 130, 132, 134, 136. However, in other examples, the frame members 102, 104, 126, 128 may be of a fixed length and exclude further frame members 130, 132, 134, 136.

Additionally, while the lift mechanism 84 of the representative embodiment illustrated in FIG. 1 includes four frame members 102, 104, 126, 128, the lift mechanism 84 may include any suitable number of frame members.

As previously stated, the slidable member 98 is coupled to the first end 114 of the first frame member 102 and, therefore, the first end 114 of the first frame member 102 and the slidable member 98 may be integrally moveable along the length of the channel 100. As such, as the slidable member 98 moves between the plurality of positions in the channel 100, the lift mechanism 84 moves between the plurality of vertical configurations, which correspond to the position of the slidable member 98.

Figure 4:
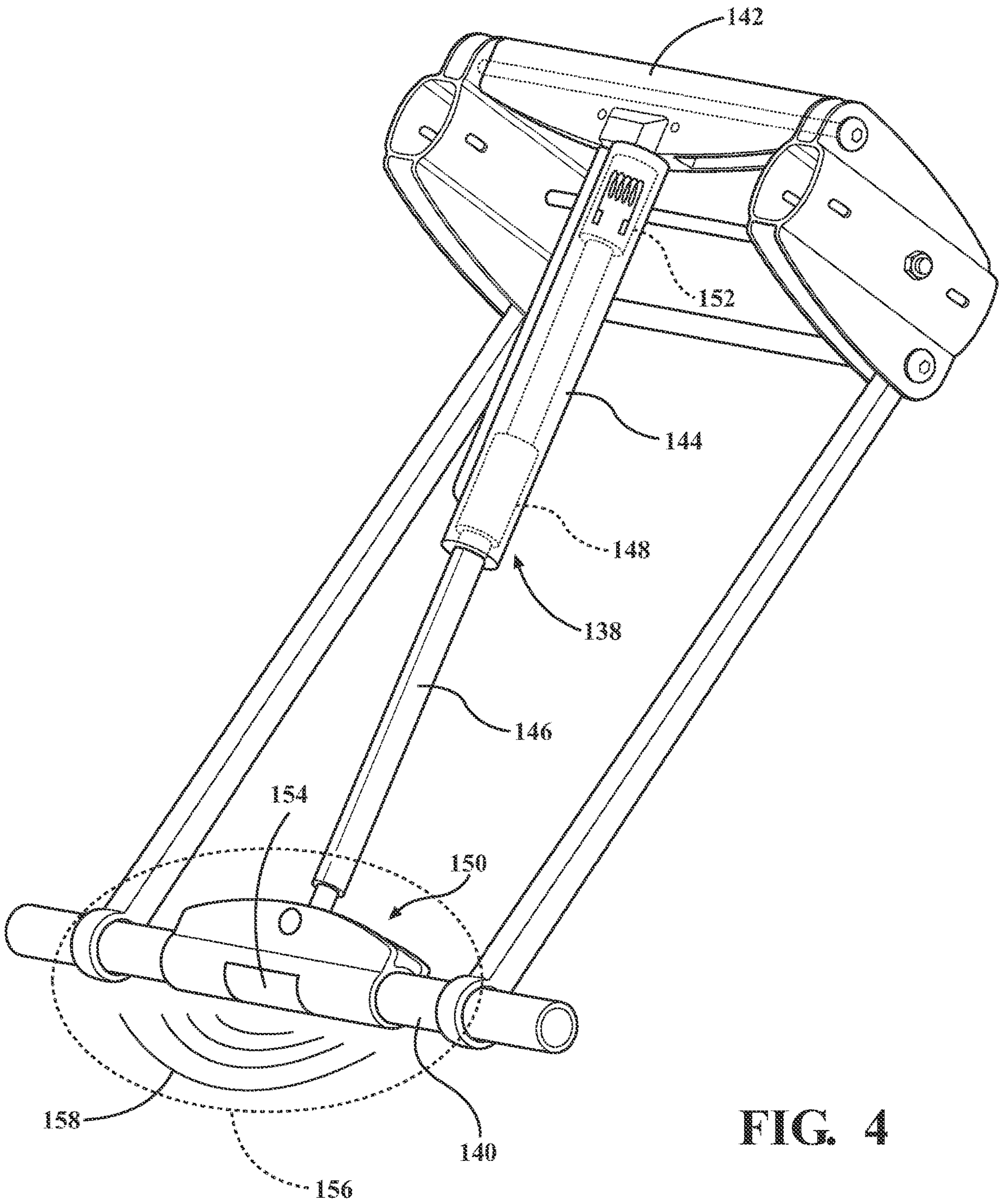
FIG. 4 is a perspective view of an actuator of the patient transport apparatus of FIG. 1.

Those having ordinary skill in the art will appreciate that the lift mechanism 84 may move between the plurality of vertical configurations due to a patient care provider applying a manual action to the lift mechanism 84, or components thereof. Additionally or alternatively, the patient transport apparatus 20 may include one or more actuators 138, which may be coupled to any suitable component of the lift mechanism 84 and may be configured to move the lift mechanism 84 between the plurality of vertical configurations. As shown in FIG. 4, the illustrated actuator 138 is realized as a hydraulic linear actuator, which is connected to and extends between the respective brackets 140 and 142. In this particular embodiment, the hydraulic linear actuator includes a cylindrical housing 144 fastened to the bracket 142, the cylindrical housing 144 including a reciprocal rod 146 having a piston 148 located within the cylindrical housing 144. The distal end of the reciprocal rod 146 is connected by a joint 150 to the bracket 140. The joint 150 allows pivotal movement about two orthogonally related axes. Extension and retraction of the reciprocal rod 146 will facilitate movement of the frame members 102, 126 of the lift mechanism 84 about the axis of the reciprocal rod 146.

The actuator 138 is further described in U.S. Pat. No. 7,398,571, filed on Jun. 30, 2005, entitled, "Ambulance Cot and Hydraulic Elevating Mechanism Therefor," the disclosure of which is hereby incorporated by reference in its entirety. Furthermore, techniques for utilizing actuator 138 to manipulate the components of the patient transport apparatus 20 can be like those described in U.S. Patent Application Publication No. 2018/0303689 A1.

In some embodiments, the actuator 138 may not be the hydraulic linear actuator shown in FIG. 4. The actuator 138 may be any actuator suitable for actuating the lift mechanism 84 such that the lift mechanism 84 moves between the plurality of vertical configurations. For example, the actuator 138 may be an electric motor, a servo motor, a pneumatic actuator, or any other suitable actuator.

Also shown in FIG. 4, the patient transport apparatus 20 may include a first sensor 152 configured to sense a force acting on the base 62. In the embodiment of FIG. 4, the first sensor 152 comprises a strain gauge disposed within the cylindrical housing 144 and coupled to the piston 148. As such, the first sensor 152 may sense, via the strain gauge, force acting on the base 62 relative to the support frame 22 based on a load applied to the piston 148. Additionally, it will be appreciated that the strain gauge may be coupled to any component of the lift mechanism 84 suitable for sensing force acting on the base 62 relative to the support frame 22. For example, the strain gauge may be disposed on the reciprocal rod 146 or the piston 148.

It will be appreciated that the force sensed by the first sensor 152 may be any force acting on any part of the base 62 relative to the support frame 22. For example, the force may be a force generated by the weight of the base 62, or a force generated by the base 62 coming into contact with an object, a surface 92, and the like. Here, the first sensor 152 may sense a force generated by an object coming into contact with a top, bottom, or side of the base 62.

In some embodiments, the first sensor 152 may comprise a load cell coupled to the lift mechanism 84 and being configured to sense a load applied to the lift mechanism 84, the load corresponding to the force being applied on the base 62. In another example, where the patient transport apparatus 20 includes a hydraulic actuator configured to actuate the lift mechanism 84, the first sensor 152 may be disposed within the hydraulic actuator and may sense a pressure within the hydraulic actuator corresponding to the force acting on the base 62. In yet another example, the first sensor 152 may include a current sensor configured to sense an electrical current drawn by the lift mechanism 84 corresponding to the force acting on the base 62. In still another example, the first sensor 152 may include an accelerometer configured to sense a speed of a component of the patient transport apparatus 20 corresponding to the force acting on the base 62.

Also shown in FIG. 4, the patient transport apparatus 20 may include a second sensor 154 configured to sense a presence of an object within an envelope 156 defined as adjacent to the base 62. In the embodiment of FIG. 4, the second sensor 154 is an infrared sensor coupled to the joint 150 and is configured to detect, using infrared light 158, the presence of an object within the envelope 156. In such an embodiment, the envelope may be defined as a distance from the base 62 corresponding to a range of detection of the infrared sensor. In other embodiments, the second sensor 154 may be coupled to any other component of the lift mechanism 84 suitable for sensing the presence of an object within the envelope 156. In still other embodiments, the second sensor 154 may include any sensor suitable for sensing the presence of an object within the envelope 156. For example, the second sensor 154 may include a proximity sensor, an ultrasound sensor, a Hall effect sensor, a LiDAR sensor, an optical sensor, and the like. Additionally, in some embodiments, the patient transport apparatus 20 may optionally omit the second sensor 154.

Figure 5A:
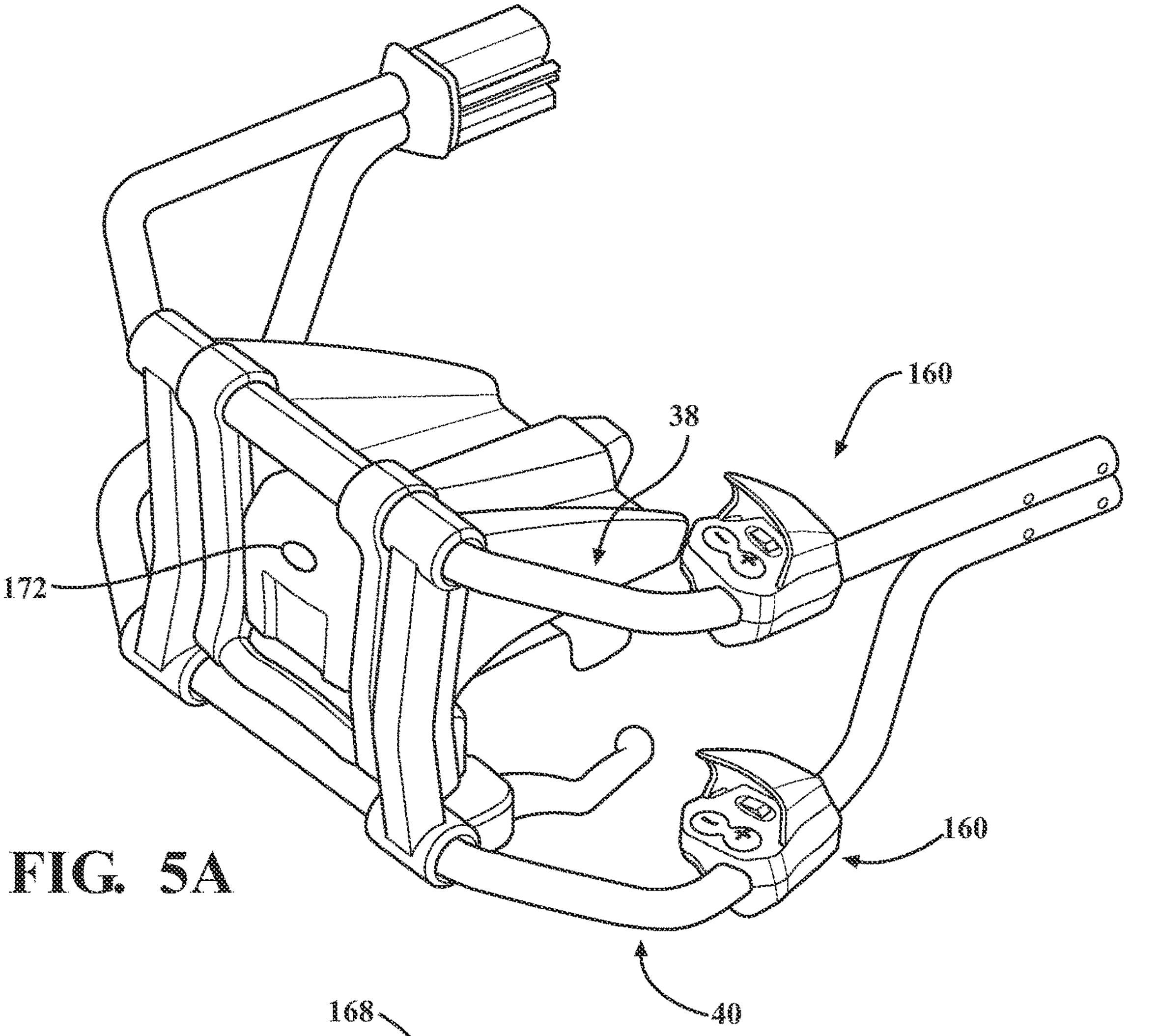
FIGS. 5A and 5B are perspective views of a user interface of the patient transport apparatus of FIG. 1.
Figure 5B:
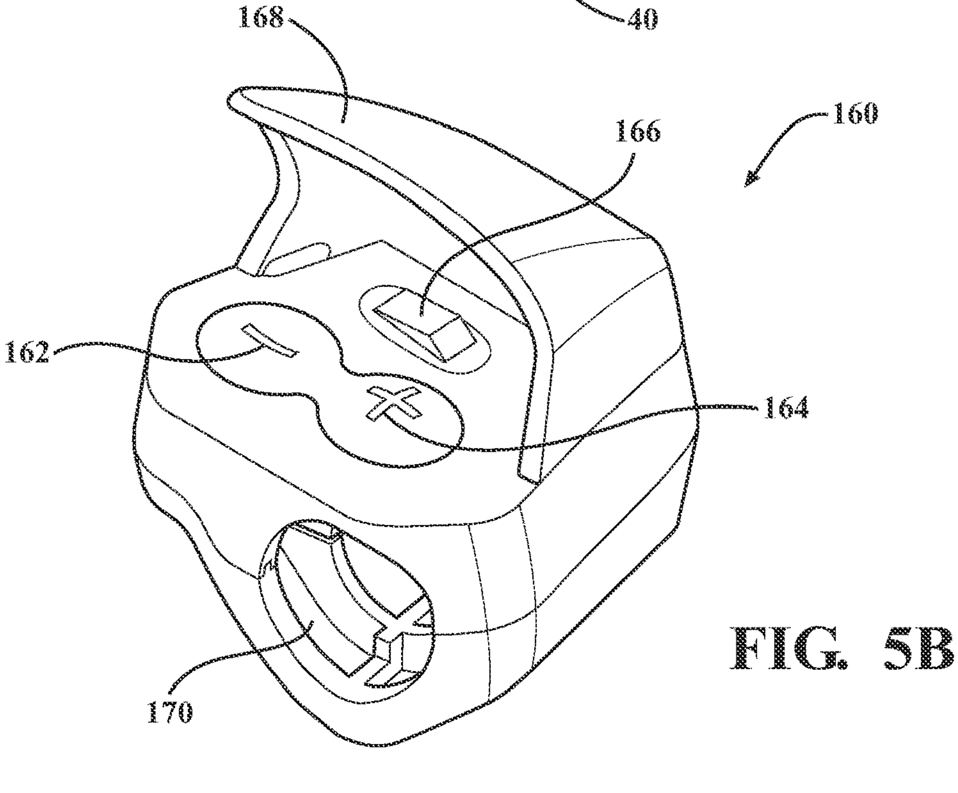

Referring now to FIGS. 1 and 5A-5B, the patient transport apparatus 20 may also include a user interface 160 configured for engagement by a user of the patient transport apparatus 20. As shown in the embodiment illustrated in FIG. 5A, the user interface 160 may be coupled to the frame member 38 and/or frame member 40. In the embodiment illustrated in FIG. 1, the user interface 160 is located at a longitudinal end of the support frame 22. However, other locations are contemplated.

Referring to FIG. 5B, the user interface 160 may include a pair of manually-engageable buttons 162 and 164 thereon. In the embodiment of FIG. 5B, the pair of manually-engageable buttons 162 and 164 may be a retract button 162 (illustrated as a button labelled as "−") and an extend button 164 (illustrated as a button labelled as "+"), respectively, and correspond to moving the lift mechanism 84 toward the retracted or extended configurations 88, 86. Additionally, in the embodiment of FIGS. 1, 5A, and 5B, the patient transport apparatus 20 allows a user to perform a user override, which will be further described herein. As shown, the user interface 160 in FIGS. 1, 5A, and 5B includes a user override switch 166, which allows a user to perform the user override. The manually-engageable buttons 162 and 164 and the user override switch 166 are shielded from above by a shroud 168 and are of a low profile casing design to prevent inadvertent actuation of the buttons 162 and 164 and the user override switch 166 by a patient lying on the patient support surface 50 of the support frame 22. That is, the shroud 168 is oriented at the head end of the user interface 160. The user interface 160 includes an opening 170 extending therethrough and through which the frame member 38 or the frame member 40 extends. A fastener may be utilized to facilitate a connection of the user interface 160 to the frame member 38 extending through the opening 170.

In some embodiments, the user interface 160 may differ from the user interface 160 shown in FIGS. 1, 5A, and 5B. For example, the user interface 160 may be embodied as a touchscreen. In another example, the user interface 160 may include a visual and/or auditory indicator 172 (shown in FIGS. 1 and 5A) configured to notify a user of a state of the patient transport apparatus 20. In yet another example, the user interface 160 may include buttons and switches, similar to the buttons 162, 164 and the user override switch 166 of the patient transport apparatus 20 in FIGS. 1, 5A, and 5B; however, the buttons and switches may be configured differently. For example, the buttons may not include the retract button 162 and the extend button 164 and may not correspond to moving the lift mechanism 84 toward the retracted or extended configuration 88, 86. Additionally, it will be appreciated that some embodiments of the patient transport apparatus 20 may optionally omit the user override. In such embodiments, the user interface 160 in FIGS. 1, 5A, and 5B may optionally omit the user override switch 166. Other configurations are contemplated.

Figure 6:
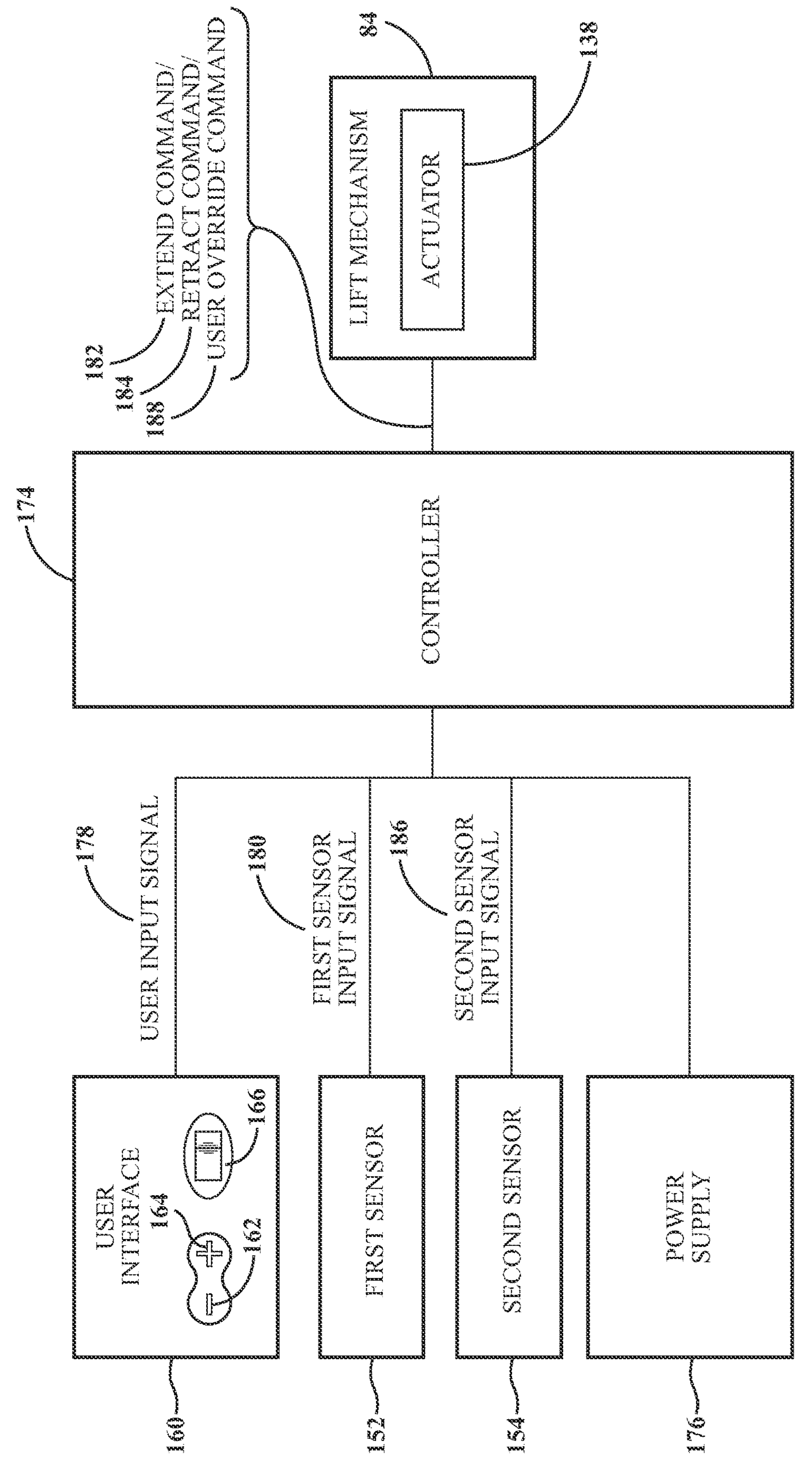
FIG. 6 is a schematic diagram of the user interface, a first sensor, a second sensor, a power supply, a controller, a lift mechanism, and the actuator of the patient transport apparatus of FIG. 1.

Referring to FIG. 6, the patient transport apparatus 20 may include a controller 174. The controller 174 may include memory configured to store data, information, and/or programs. Additionally, the controller 174 may include one or more microprocessors, microcontrollers, field programmable gate arrays, systems on a chip, discrete circuitry, and/or other suitable hardware, software, or firmware that is capable of carrying out the functions described herein. The controller 174 may be carried on-board the patient transport apparatus 20, or may be remotely located. The controller 174 may execute instructions for performing any of the techniques described herein. Power to the controller 174 may be provided by a power supply 176, which may be a battery power supply and/or an external power source.

As shown in FIG. 6, the controller 174 may be coupled to the lift mechanism 84, the user interface 160, and the first sensor 152. In response to engagement by a user (e.g., after a user presses the retract button 162 or the extend button 164), the user interface 160 generates a corresponding user input signal 178, which is transmitted to the controller 174. Here, the first sensor 152 is configured to generate a first sensor input signal 180 corresponding to a force acting on the base 62 relative to the support frame 22. The controller 174 is configured to determine if the user input signal 178 corresponds to an extend command 182 or a retract command 184 and if a magnitude of the force acting on the base 62 exceeds a predetermined threshold value based on the first sensor input signal 180. If the user input signal 178 corresponds to the extend command 182 or the retract command 184, the controller 174 may drive the lift mechanism 84 toward the extended configuration 86 or toward the retracted configuration 88, respectively. If, however, the controller 174 determines that the force acting on the base has exceeded the predetermined threshold value, the controller 174 interrupts driving of the lift mechanism 84 between the extended configuration 86 and the retracted configuration 88.

The controller 174 may determine that the predetermined threshold value has been exceeded based on the first sensor input signal 180 in situations during use where the base 62 comes into contact with an object. For example, referring to the first sensor 152 shown in FIG. 4, the first sensor 152 includes a strain gauge configured to determine a load applied to the piston 148, which corresponds to a force acting on the base 62. In such an embodiment, the first sensor input signal 180 may indicate that a force created by the weight of the base 62 is applying a load to the piston 148. In this instance, the controller 174 may determine that the force created by the weight of the base 62 has not exceeded the predetermined threshold value. However, the first sensor input signal 180 may also indicate that a force generated by a bumper of an emergency response vehicle has come into contact with the base 62 and is applying a load to the piston 148. In this instance, the controller 174 may determine that the force generated by the bumper coming into contact with the base 62 has exceeded the predetermined threshold value. It will be appreciated that the predetermined threshold value may be adjusted based on a desired level of sensitivity.

In some embodiments, the patient transport apparatus 20 may include the second sensor 154 (shown in FIG. 4). In such embodiments, the second sensor 154 is configured to generate the second sensor input signal 186 corresponding to the presence of an object within the envelope 156. The controller 174 is then further configured to determine if the object will come into contact with the base 62 based on the second sensor input signal 186 and interrupt driving of the lift mechanism 84 between the extended configuration 86 and the retracted configuration 88 in response to determining that the object will come into contact with the base 62.

In some embodiments, the user interface 160 of the patient transport apparatus 20 allows a user to perform the user override. For example, in the embodiment of FIGS. 1, 5A, and 5B, the user interface 160 may include the user override switch 166. In such embodiments, the controller 174 may be further configured to determine if the user input signal 178 corresponds to a user override command 188. If the controller 174 determines that the user input signal 178 corresponds to the user override command 188 and if the controller 174 has interrupted driving of the lift mechanism 84 (after determining that the force acting on the base 62 has exceeded the predetermined threshold value, or after determining that an object present within the envelope 156 will come into contact with the base 62), the controller 174 resumes driving the lift mechanism 84 toward the extended configuration 86 or the retracted configuration 88.

Figure 7A:
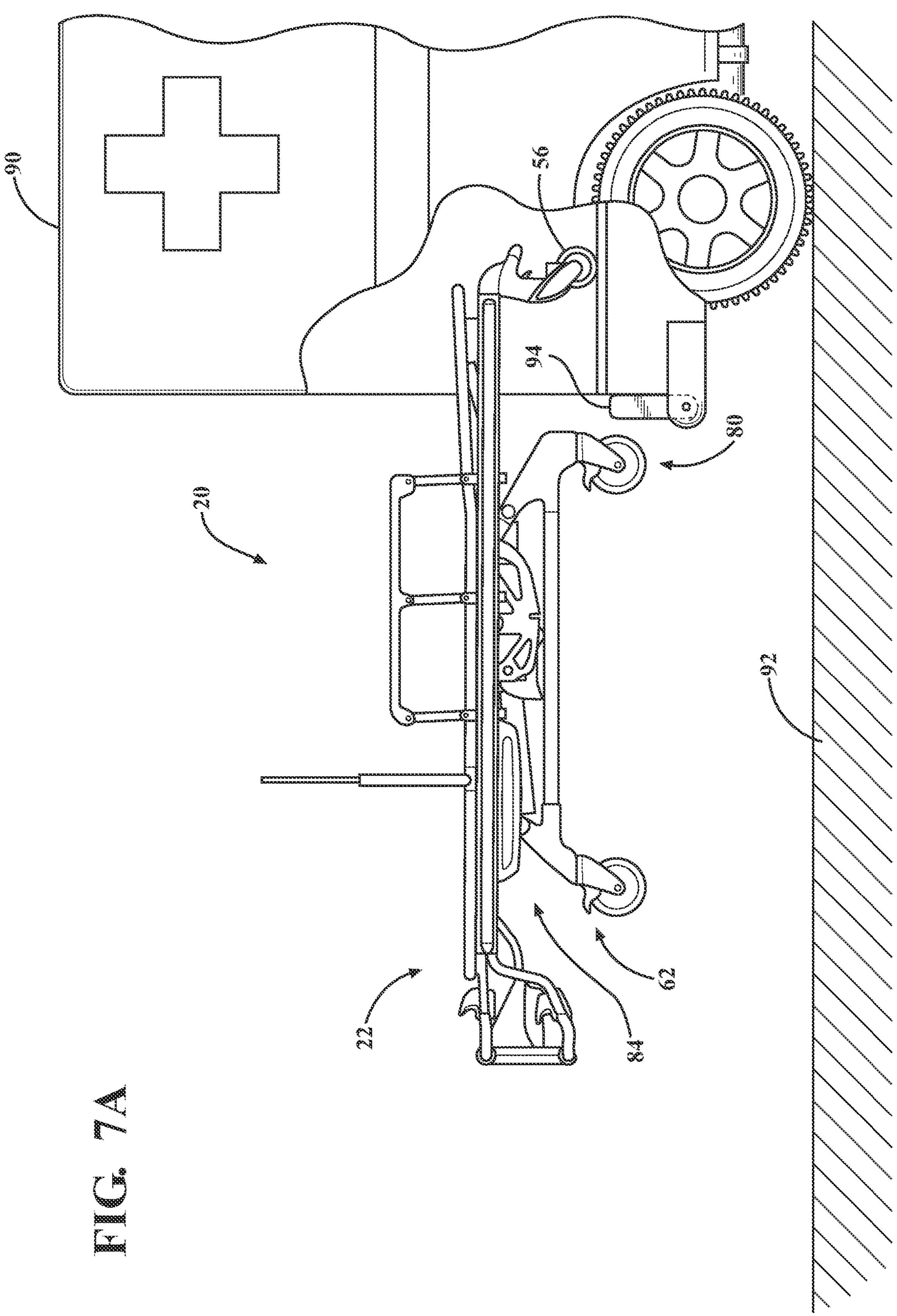
FIGS. 7A and 7B are side views of the patient transport apparatus of FIG. 1 being loaded/unloaded into an emergency response vehicle.
Figure 7B:
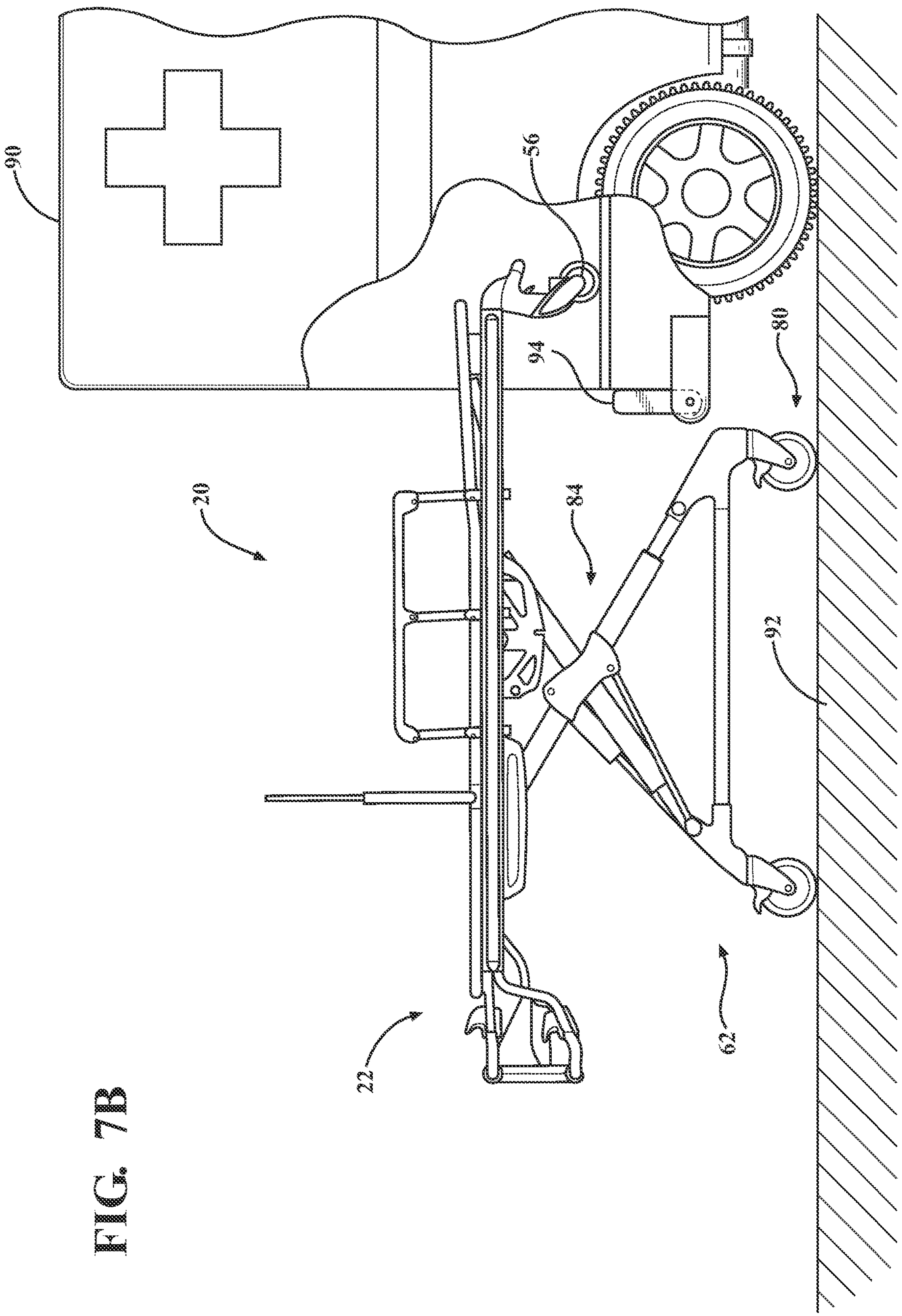

FIGS. 7A and 7B illustrate an instance where the fold-up step 94 is folded up. As such, the lift mechanism 84 is able to move to the retracted configuration 88 (as shown in FIG. 7A) and to the extended configuration 86 (as shown in FIG. 7B) without the controller 174 determining that the force acting on the base 62 has exceeded the predetermined threshold value, or determining that an object present within the envelope 156 will come into contact with the base 62.

Figure 8A:
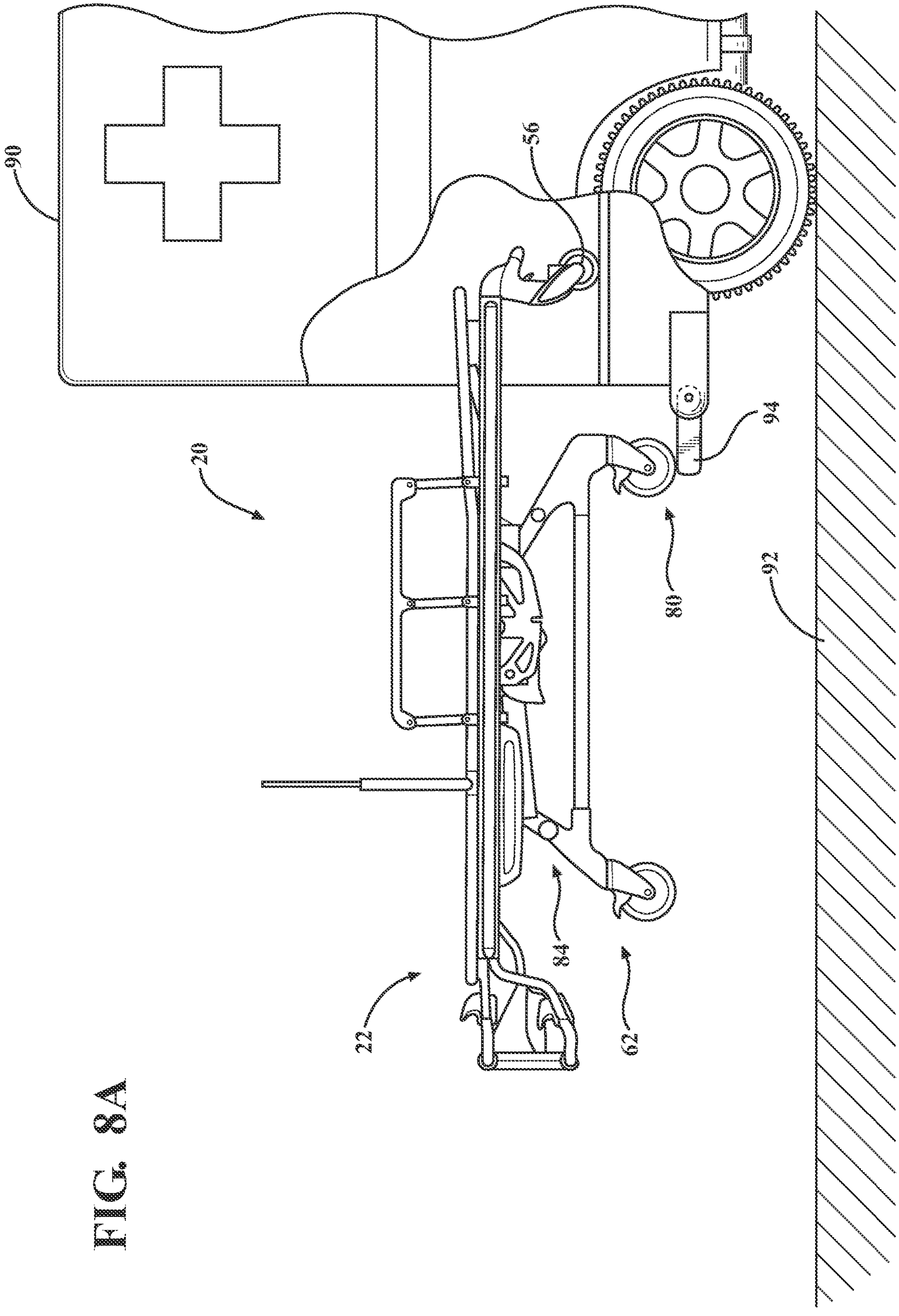
FIGS. 8A and 8B are side views of an instance where a base of the patient transport apparatus of FIG. 1 comes into contact with a fold-up step of the emergency response vehicle.
Figure 8B:
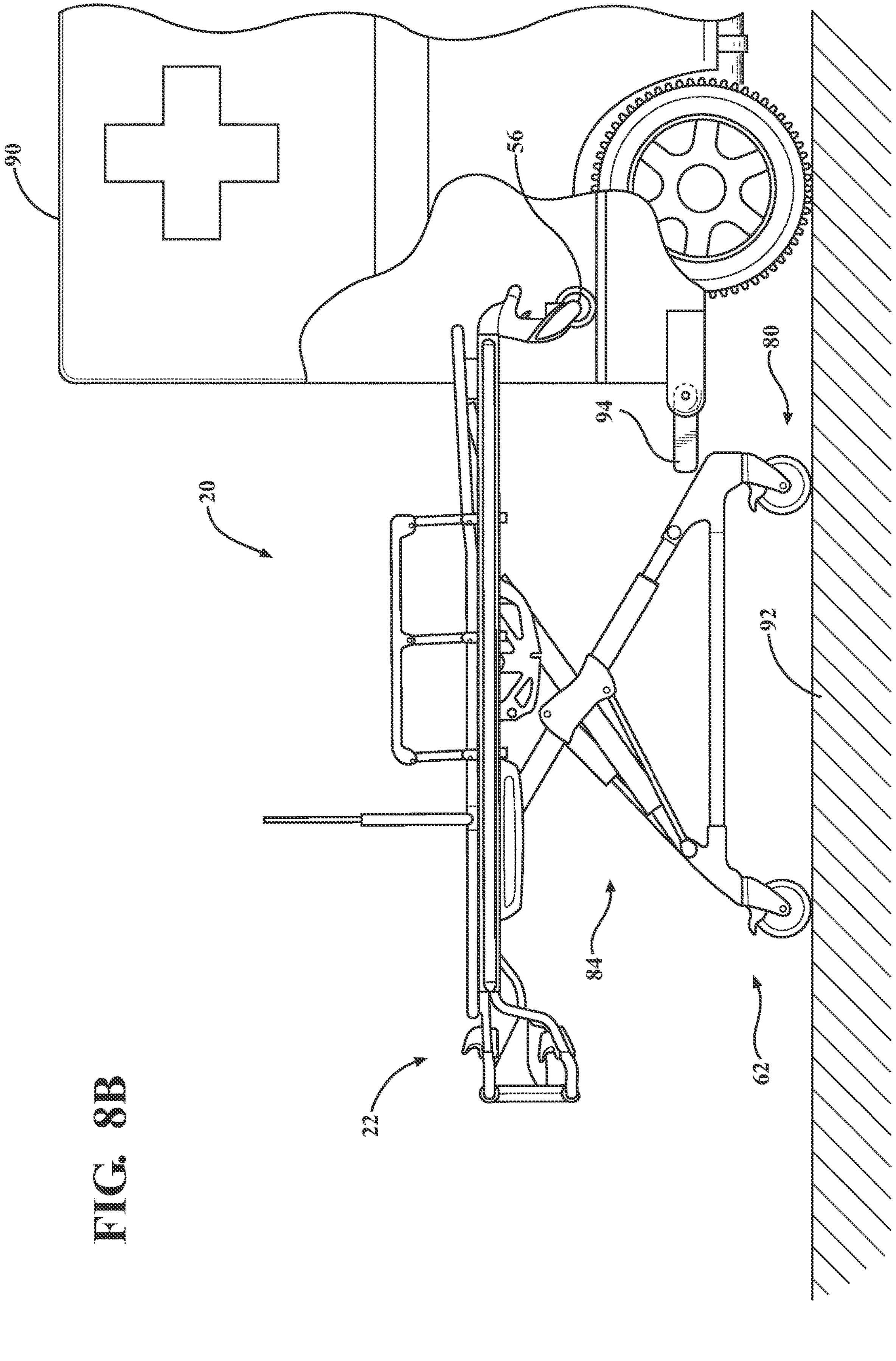
Figure 8C:
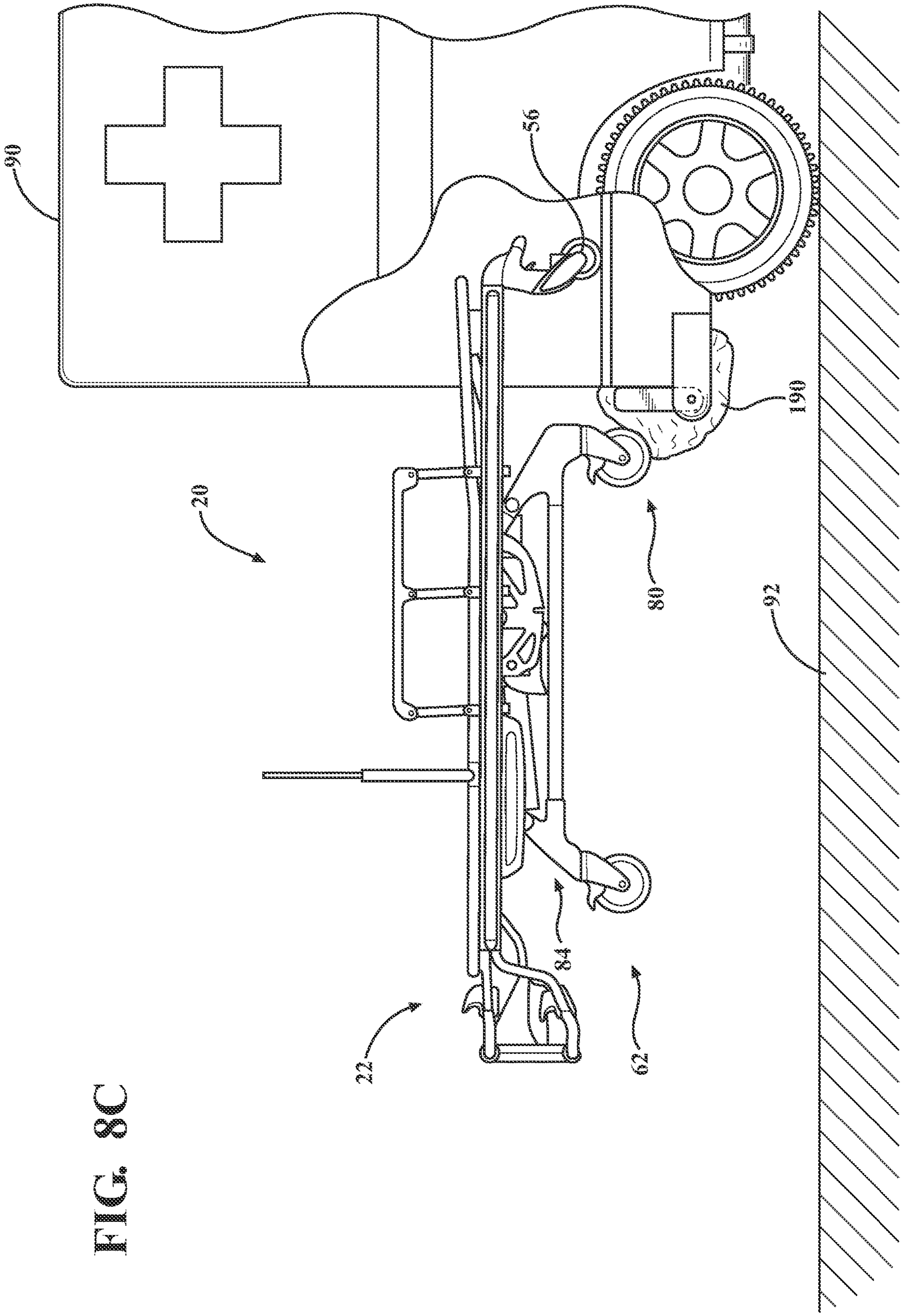
FIG. 8C is a side view of an instance where the base of the patient transport apparatus of FIG. 1 comes into contact with snow on the fold-up step of the emergency response vehicle.

FIGS. 8A and 8B illustrate instances where the fold-up step 94 is not folded-up and a bottom of the base 62 (e.g., the caster wheel assembly 80), in FIG. 8A, and a top of the base 62, in FIG. 8B, comes into contact with the fold-up step 94. Similarly, in FIG. 8C, the fold-up step 94 is likewise folded-up, but is covered in snow 190 and therefore the bottom of the base 62 (e.g., the caster wheel assembly 80) comes into contact with the snow 190 covering fold-up step 94. In each of these instances, the first sensor 152 generates the first sensor input signal 180, which corresponds to a force generated by the fold-up step 94 (or the snow 190) coming into contact with the base 62. The controller 174 then determines that that the force acting on the base 62 relative to the support frame 22 has exceeded the predetermined threshold value based on the first sensor input signal 180. As such, the controller 174 interrupts driving of the lift mechanism 84 between the extended configuration 86 and the retracted configuration 88.

Figure 8D:
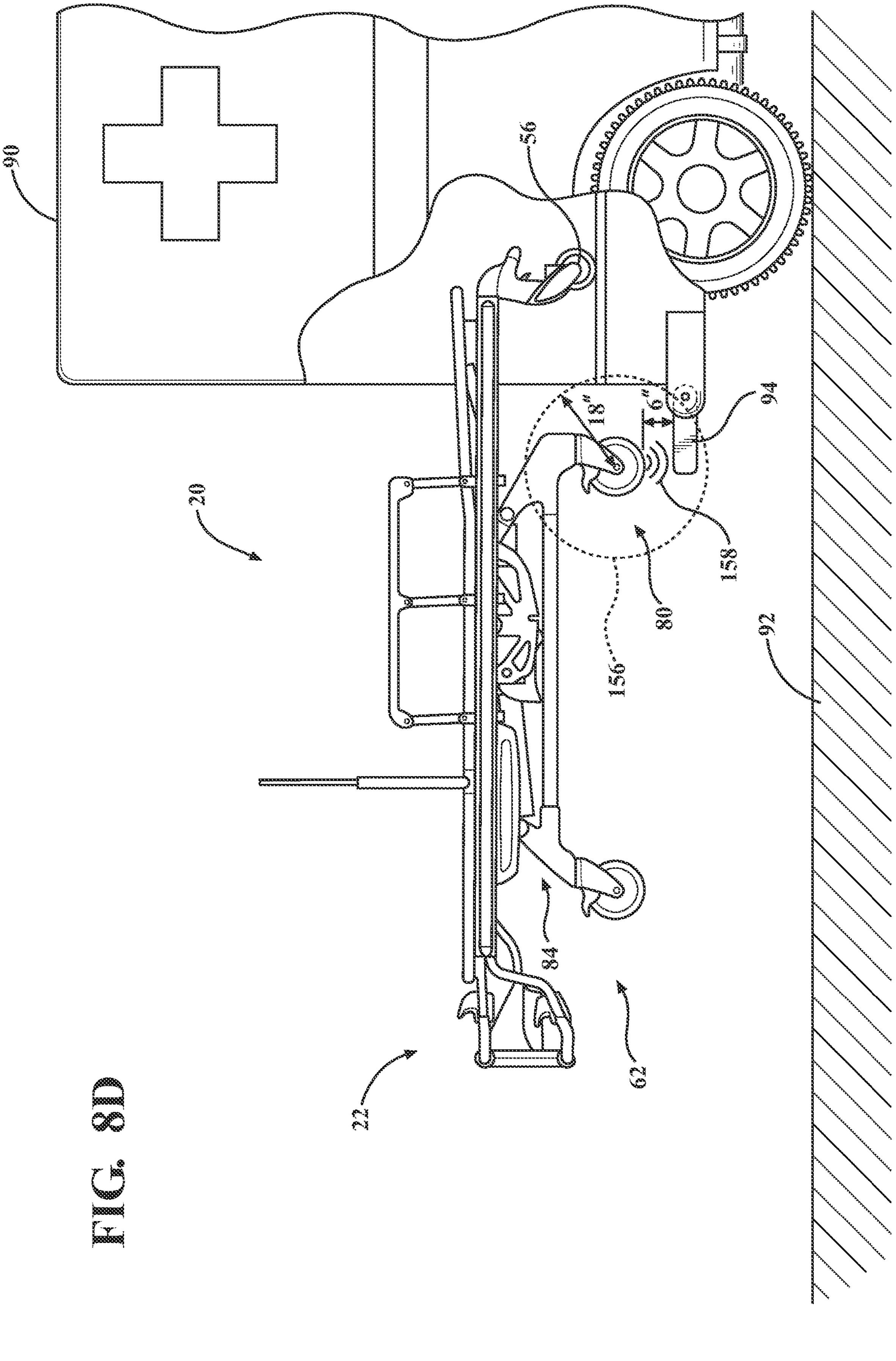
FIG. 8D is a side view of an instance where the base of the patient transport apparatus of FIG. 1 will come into contact with the fold-up step of the emergency response vehicle.

FIG. 8D illustrates an embodiment where the patient transport apparatus 20 includes the second sensor 154 (shown in FIG. 4). Hence, in FIG. 8C, the fold-up step 94 is not folded-up and is within the envelope 156. Thus, if extended, the base 62 would come into contact with the fold-up step 94. In such an instance, the second sensor 154 generates the second sensor input signal 186, which corresponds to the presence of an object within the envelope 156. In FIG. 8D, the second sensor 154 is an infrared sensor configured to generate the second sensor input signal 186 based on detecting a presence of the fold-up step 94 within the envelope 156. As previously stated, the envelope 156 is defined as a distance corresponding to a range of detection of the infrared sensor, which is defined as within eighteen inches of the caster wheel assembly 80 of the base 62 in FIG. 8D. The controller 174 then determines if the fold-up step 94 present within the envelope 156 will come into contact with the base 62 based on the second sensor input signal 186. In FIG. 8D, the controller 174 determines if an object present within the envelope 156 will come into contact with the base 62 if the object is within a distance of six inches from the caster wheel assembly 80 of the base 62. As such, the controller 174 determines that the fold-up step 94 is within the distance of six inches and interrupts driving of the lift mechanism 84 between the extended configuration 86 and the retracted configuration 88.

Figure 8E:
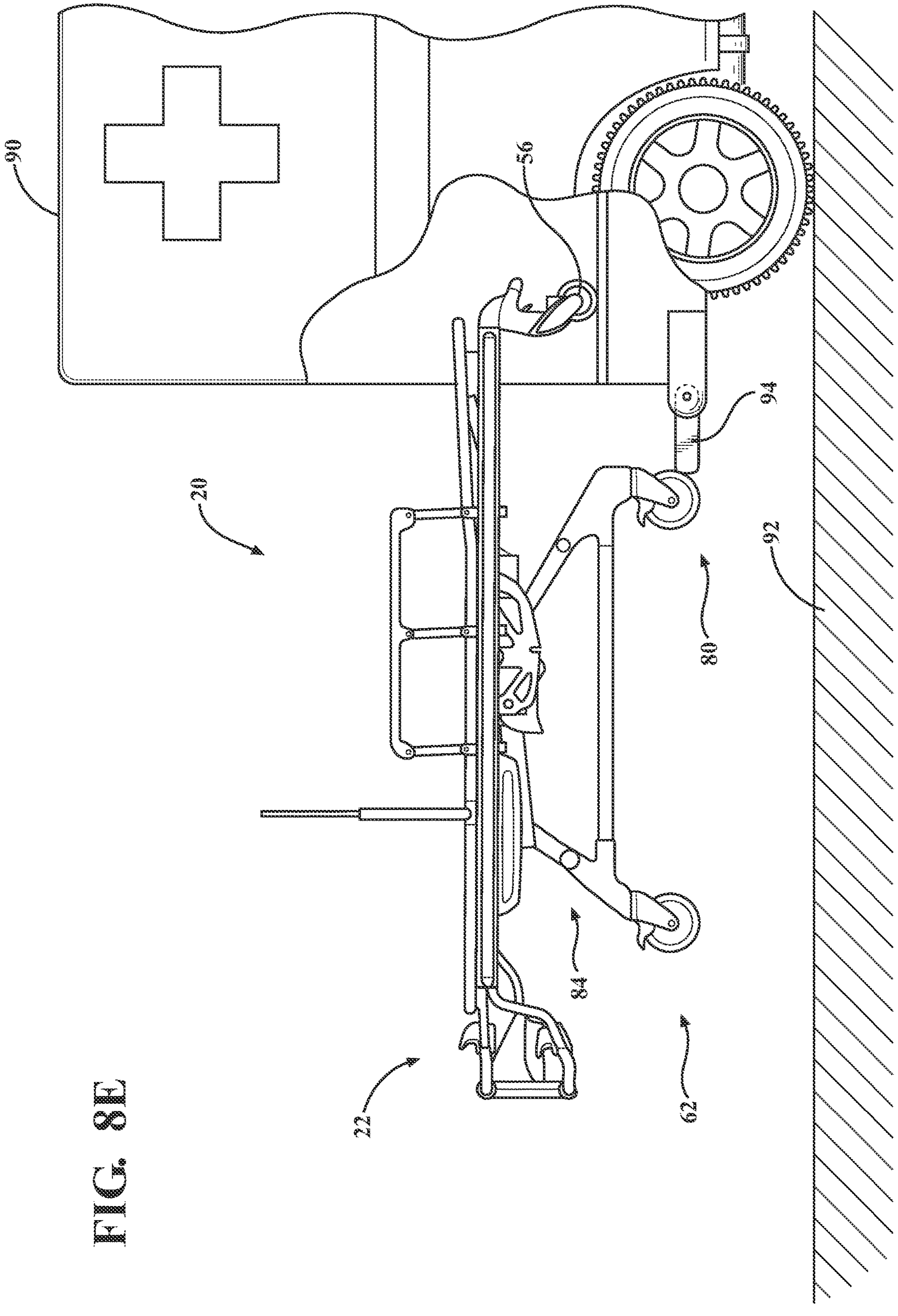
FIG. 8E is a side view of an instance where the patient transport apparatus of FIG. 1 moves toward the extended configuration, as a result of a user override, even though the base of the patient transport apparatus comes into contact with the fold-up step of the emergency response vehicle.

FIG. 8E illustrates an embodiment where the user interface 160 of the patient transport apparatus 20 allows a user to perform the user override. Furthermore, in FIG. 8E, the fold-up step 94 is not folded-up, and the caster wheel assembly 80 comes into contact with the fold-up step 94 while the base 62 is moving toward the extended configuration 86. In such an instance, the first sensor 152 generates the first sensor input signal 180, which corresponds to a force generated by the fold-up step 94 coming into contact with the base 62. The controller 174 then determines that the force generated by the fold-up step 94 coming into contact with the base 62 has exceeded the predetermined threshold value based on the first sensor input signal 180. As such, the controller 174 interrupts driving of the lift mechanism 84. However, in FIG. 8E, after the controller 174 interrupts driving of the lift mechanism, the user input signal 178 generated by the user interface 160 corresponds to the user override command 188, which may occur by the user switching the user override switch 166 (shown in FIGS. 5A, 5B). Here, the controller 174 continues driving the lift mechanism 84 toward the extended configuration 86, even though the caster wheel assembly 80 is coming into contact with the fold-up step 94. Similarly, in embodiments where the user interface 160 allows a user to perform the user override and the patient transport apparatus 20 includes the second sensor 154, the controller 174 interrupts driving of the lift mechanism 84 if the controller 174 determines that an object present within the envelope 156 will come into contact with the base 62, but continues driving the lift mechanism 84 if the user input signal 178 corresponds to the user override command 188.

Figure 9:
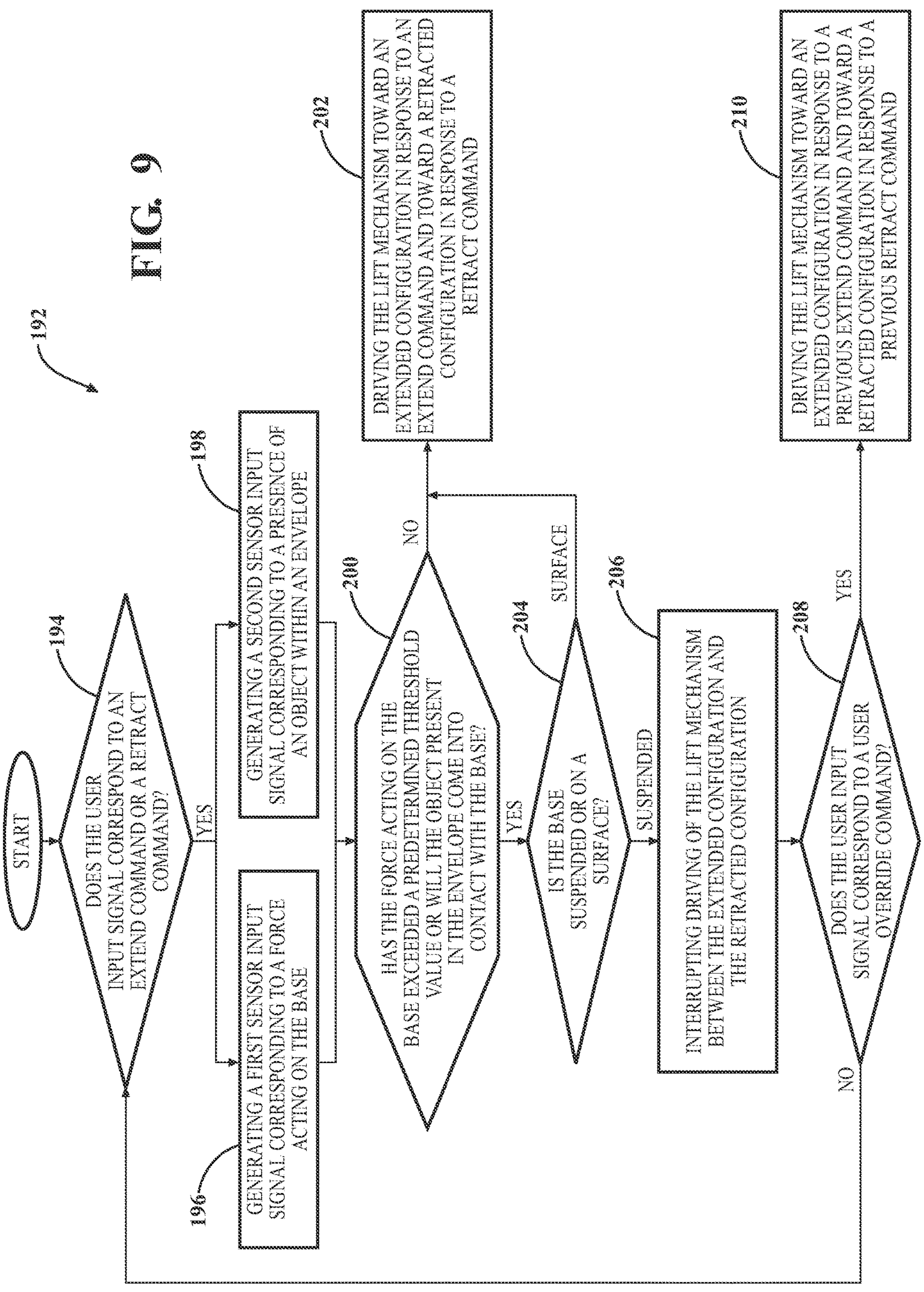
FIG. 9 is a diagrammatic view of a method of detecting a force acting on the base of the patient support apparatus of FIG. 1.

To further illustrate the above-described configuration of the controller 174, a method 192 of detecting a force acting on the base 62 is shown in FIG. 9. It will be appreciated that, in embodiments where the controller 174 includes the second sensor 154, the method 192 is also a method of detecting the presence of an object within the envelope 156. As shown, the method 192 includes a step 194 of determining if the user input signal 178 corresponds to the extend command 182 or the retract command 184; a step 196 of generating the first sensor input signal 180 corresponding to a force acting on the base 62 relative to the support frame 22; a step 198 of generating the second sensor input signal 186 corresponding to the presence of an object within the envelope 156; a step 200 of determining if the force acting on the base 62 has exceeded the predetermined threshold value based on the first sensor input signal 180 or if the object present within the envelope 156 will come into contact with the base 62 based on the second sensor input signal 186; a step 202 of driving the lift mechanism 84 toward the extended configuration 86 in response to the extend command 182 and toward the retracted configuration 88 in response to the retract command 184; a step 204 of determining if the base 62 is suspended or on a surface 92; a step 206 of interrupting driving of the lift mechanism 84 between the extended configuration 86 and the retracted configuration 88; a step 208 of determining if the user input signal 178 corresponds to the user override command 188; and a step 210 of driving the lift mechanism 84 toward the extended configuration 86 in response to a previous extend command 182 and toward the retracted configuration 88 in response to a previous retract command 184.

The step 194 of determining if the user input signal 178 corresponds to the extend command 182 or the retract command 184 may be executed by the controller 174. As shown in FIG. 6, the controller 174 receives the user input signal 178 from the user interface 160. As previously stated, the user interface 160 is configured for engagement by the user and generates a corresponding user input signal 178. For example, in the embodiment of FIGS. 1, 5A, and 5B, the user interface 160 includes the retract button 162 and the extend button 164. In such embodiments, if the user of the patient transport apparatus 20 intends to retract or extend the lift mechanism 84, the user may press the retract button 162 or the extend button 164, respectively. As such, the user interface 160 is configured to receive a retract input and an extend input as the user input and generate the corresponding user input signal 178. Accordingly, during step 194, after receiving the user input signal 178, the controller 174 determines that the user input signal 178 corresponds to the retract command 184 or the extend command 182.

The step 196 of generating the first sensor input signal 180 corresponding to a force acting on the base 62 and the step 198 of generating the second sensor input signal 186 corresponding to the presence of an object within the envelope 156 may be executed by the first sensor 152 and the second sensor 154, respectively. As shown in FIG. 6, after the first sensor 152 and the second sensor 154 generate the first sensor input signal 180 and the second sensor input signal 186, the controller 174 receives the first sensor input signal 180 and the second sensor input signal 186.

During step 198, the second sensor 154 may be configured to generate the second sensor input signal 186 in response to detecting the presence of an object. In further embodiments, the second sensor 154 may be configured to generate the second sensor input signal 186 in response to detecting the presence and a speed of an object. Here, in embodiments of the patient transport apparatus 20 which optionally omit the second sensor 154, the method 192 may optionally omit step 198.

The step 200 of determining if an object present within the envelope 156 will come into contact with the base 62 may be executed by the controller 174. Previously, in step 196, the first sensor 152 generated the first sensor input signal 180, which corresponds to a force acting on the base 62. During step 200, the controller 174 may determine that the force acting on the base 62 has exceeded the predetermined threshold value based on a magnitude of the acting on the base 62. For example, if the force acting on the base 62 is a force generated by the weight of the base 62, the controller 174 may determine that the force acting on the base 62 has not exceeded the predetermined threshold value based on the magnitude of the force generated by the weight of the base 62. However, if the force acting on the base 62 includes a force generated by an object coming into contact with the base 62, the controller 174 may determine that the force acting on the base 62 has exceeded the predetermined threshold value based on the magnitude of the force generated the object coming into contact with the base 62.

In embodiments including the second sensor 154, the step 200 also includes determining, with the controller 174, if an object present within the envelope 156 will come into contact with the base 62. Previously, in step 198, the second sensor 154 generated the second sensor input signal 186, which corresponds to the presence of an object within the envelope 156. During step 200, the controller 174 may determine if the object present within the envelope 156 will come into contact with the base 62 using a variety of techniques. For example, in an embodiment where the second sensor 154 detects the presence of an object, the controller 174 will determine if the object present within the envelope 156 will come into contact with the base 62 based on a distance between the object and the base 62. For instance, the controller 174 may be configured to determine that an object present within the envelope 156 will come into contact with the base 62 if the object is within six inches of the caster wheel assembly 80. In an embodiment where the second sensor 154 detects the presence and a speed of an object, the controller 174 may determine that an object present within the envelope 156 will come into contact with the base 62 if the object is within six inches of the caster wheel assembly 80 and travelling at a certain speed. Of course, in embodiments which optionally omit the second sensor 154, step 200 may optionally omit determining if an object present within the envelope 156 will come into contact with the base 62.

If the controller 174 determines that the force acting on the base 62 has not exceeded the predetermined threshold value based on the first sensor input signal 180 or that the object present within the envelope 156 will not come into contact with the base 62 (or if there is no object present within the envelope 156) based on the second sensor input signal 186, the method 192 proceeds to the step 202 of driving, with the controller 174, the lift mechanism 84 toward the extended configuration 86 in response to determining that the user input signal 178 corresponds to the extend command 182 during step 194, and toward the retracted configuration 88 in response to determining that the user input signal 178 corresponds to the retract command 184 during step 194. In embodiments where the controller 174 includes the actuator 138, the controller 174 may be configured to operate the lift mechanism 84 by driving the actuator 138. Furthermore, in embodiments where the controller 174 is coupled to the power supply 176 (shown in FIG. 6), the controller 174 may be configured to drive the actuator 138 by controlling power provided to the actuator 138 from the power supply 176.

If the controller 174 determines that the force acting on the base 62 has exceeded the predetermined threshold value based on the first sensor input signal 180 or that the object present within the envelope 156 will not come into contact with the base 62 based on the second sensor input signal 186, the method 192 proceeds to the step 206 of interrupting, with the controller 174, driving of the lift mechanism 84 between the extended configuration 86 and the retracted configuration 88. In embodiments where the patient transport apparatus 20 includes the actuator 138 and the controller 174 is coupled to the power supply 176, the controller 174 may be configured to interrupt driving of the lift mechanism 84 by limiting the power provided to the actuator 138 from said power supply 176. Additionally, in some embodiments, such as an embodiment where the user interface 160 includes the previously-described visual and/or auditory indicator 172, the method 192 may proceed to a step of generating an alert, with the visual and/or auditory indicator 172 after step 206.

In some embodiments, the method 192 may proceed to the step 204 of determining, with the controller 174, whether the base 62 is suspended or on a surface 92 before proceeding to step 206. Step 204 accounts for instances where a user intends for the lift mechanism 84 to extend or retract, but the controller 174 determines that the force acting on the base 62 has exceeded the predetermined threshold value. As previously stated, the lift mechanism 84 may move the support frame 22 relative to the base 62 when the patient transport apparatus 20 is supported by or otherwise at the base 62 (e.g., when the base 62 is resting on the surface 92). Therefore, before proceeding to step 206 of interrupting driving of the lift mechanism 84 in response to the threshold force being applied, the method proceeds to step 204 to determine if the base 62 is supported by/on the surface 92. As such, if the method 192 determines that the base 62 is on the surface 92 during step 204, the method 192 proceeds to step 202 of driving the lift mechanism 84. However, if the method 192 determines that the base 62 is suspended, the method 192 proceeds to step 206 of interrupting driving of the lift mechanism 84.

After interrupting driving of the lift mechanism 84 during step 206, the method 192 proceeds to the step 208 of determining, with the controller 174, if the user input signal 178 corresponds to the user override command 188. If the controller 174 determines that the user input signal 178 corresponds to the user override command 188, the method 192 proceeds to the step 210 of driving the lift mechanism 84 toward the extended configuration 86 or the retracted configuration 88.

In various embodiments, the controller 174 may use a variety of techniques to determine if the user input signal 178 corresponds to the user override command 188. For example, in some embodiments, such as the embodiment of FIGS. 1, 5A, and 5B, the user interface 160 includes the user override switch 166. In such embodiments, if a user of the patient transport apparatus 20 intends to perform a user override after the controller 174 has interrupted driving of the lift mechanism 84, the user may actuate the user override switch 166. As such, the user interface 160 is configured to receive a user override input and generate the corresponding user input signal 178. Accordingly, after receiving the user input signal 178, the controller 174 determines that the user input signal 178 corresponds to the user override command 188.

In some embodiments, the controller 174 may determine that the user input signal 178 corresponds to the user override command 188 in response to the user interface 160 receiving the user override input a predetermined amount of time after interrupting driving of the lift mechanism 84 during step 206. In further embodiments, the controller 174 may determine that the user input signal 178 corresponds to the user override command 188 in response to the user interface 160 receiving the user override input after interrupting driving of the lift mechanism 84 during step 206 and after a predetermined amount of time of no longer receiving the extend input or the retract input. The predetermined amount of time may be any suitable amount of time, such as two seconds, five seconds, ten seconds, etc.

In other embodiments, the controller 174 may determine that the user input signal 178 corresponds to the user override command 188 in response to the user interface 160 receiving the extend input or the retract input after interrupting driving of the lift mechanism 84 during step 206. This may occur in an embodiment where the patient transport apparatus 20 does not include the user override switch 166, but includes the retract button 162 and the extend button 164.

In some embodiments, the controller 174 may also determine that the user input signal 178 corresponds to the user override command 188 using a combination of the above-described techniques. For example, the controller 174 may determine that the user input signal 178 corresponds to the user override command 188 in response to the user interface 160 receiving the extend input or the retract input a predetermined amount of time after interrupting driving of the lift mechanism 84 during step 206.

If the controller 174 determines that the user input signal 178 corresponds to the user override command 188 during step 208, the method 192 proceeds to step 210. During step 210, the controller 174 drives the lift mechanism 84 toward the extended configuration 86 or the retracted configuration 88. In one embodiment, the controller 174 may drive the lift mechanism 84 toward the extended configuration 86 or the retracted configuration 88 based on determining if the user input signal 178 corresponded to the extend command 182 or the retract command 184 prior to corresponding to the user override command 188.

If the controller 174 determines that the user input signal does not correspond to the user override command 188 during step 208, the method 192 proceeds back to step 194. As such, the controller 174 will continue to interrupt driving of the lift mechanism 84 during step 206 until the user input signal 178 corresponds to the user override command 188. However, after proceeding back to step 194 after step 208, the controller 174 may proceed to step 202 and resume driving the lift mechanism 84 if the controller 174 determines that the user input signal 178, which previously corresponded to the extend command 182, now corresponds to the retract command 184, or vice versa. For example, in one instance, the controller 174 may interrupt driving of the lift mechanism 84 after determining that the user input signal 178 corresponds to the extend command 182 during step 194 and after determining that the force acting on the base 62 has exceeded the predetermined threshold value. As such, the method 192 may proceed to step 202 after the controller 174 determines that the user input signal 178 corresponds to the retract command 184 during step 194.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus for use in loading and unloading into a cargo area of an emergency response vehicle, the patient transport apparatus comprising:

a base;

a support frame comprising a patient support surface configured to support a patient;

a lift mechanism interposed between the base and the support frame and being configured to move between a plurality of vertical configurations including an extended configuration and a retracted configuration, wherein the base and the support frame are separated by a first distance in the extended configuration and a second distance in the retracted configuration, and wherein the first distance is greater than the second distance;

a user interface configured for engagement by a user to generate a user input signal;

an object sensor configured to generate an object sensor signal corresponding to a presence of an object within an envelope defined as adjacent to the base; and a controller coupled to the lift mechanism, the user interface, and the object sensor, the controller being configured to:

determine if an object present within the envelope will come into contact with the base based on the object sensor signal, drive the lift mechanism in response to receiving the user input signal, and interrupt driving of the lift mechanism between the extended configuration and the retracted configuration to stop motion of the lift mechanism in response to determining that the object present within the envelope will come into contact with the base; and wherein the user interface is configured to generate an alert in response to the controller interrupting driving of the lift mechanism.

2. The patient transport apparatus of claim 1, wherein the controller is further configured to determine if the object present within the envelope will come into contact with the base based on a distance between the object and the base.

3. The patient transport apparatus of claim 1, wherein the controller is further configured to determine if the object present within the envelope will come into contact with the base based on a distance between the object and the base and a speed of the object.

4. The patient transport apparatus of claim 1, wherein the controller is configured to:

determine if the user input signal corresponds to a user override command; and drive the lift mechanism toward the extended configuration or the retracted configuration in response to determining that the user input signal corresponds to the user override command.

5. The patient transport apparatus of claim 4, wherein the user interface is configured to receive an extend input and a retract input.

6. The patient transport apparatus of claim 5, wherein the controller is further configured to determine that the user input signal corresponds to the user override command in response to the user interface receiving the extend input or the retract input after interrupting driving of the lift mechanism.

7. The patient transport apparatus of claim 5, wherein the user interface is configured to receive a user override input as the user input signal.

8. The patient transport apparatus of claim 7, wherein the controller is further configured to determine that the user input signal corresponds to the user override command in response to the user interface receiving the user override input after interrupting driving of the lift mechanism.

9. The patient transport apparatus of claim 7, wherein the controller is further configured to determine that the user input signal corresponds to the user override command in response to the user interface receiving the user override input a predetermined amount of time after interrupting driving of the lift mechanism.

10. The patient transport apparatus of claim 7, wherein the controller is further configured to determine that the user input signal corresponds to the user override command in response to the user interface receiving the user override input after interrupting driving of the lift mechanism and a predetermined amount of time after no longer receiving the extend input or the retract input.

11. The patient transport apparatus of claim 1, wherein the patient transport apparatus further comprises a force sensor configured to generate a force sensor signal corresponding to a force acting on the base relative to the support frame; and wherein the controller is further configured to:

determine if the force acting on the base has exceeded a predetermined threshold value based on the force sensor signal, and interrupt driving of the lift mechanism between the extended configuration and the retracted configuration to stop motion of the lift mechanism in response to the force sensor signal exceeding the predetermined threshold value.

12. The patient transport apparatus of claim 11, wherein the force sensor is configured to generate the force sensor signal in response to sensing a load on the lift mechanism corresponding to the force acting on the base.

13. The patient transport apparatus of claim 1, wherein the lift mechanism comprises an actuator and wherein the controller is configured to drive the lift mechanism by driving the actuator.

14. The patient transport apparatus of claim 13, wherein the controller is coupled to a power supply and wherein the controller is configured to drive the actuator by controlling power provided to the actuator from the power supply.

15. The patient transport apparatus of claim 14, wherein the controller is configured to interrupt driving of the lift mechanism by limiting the power provided to the actuator from the power supply.

16. The patient transport apparatus of claim 1, wherein the base comprises at least three wheels.

17. A patient transport apparatus for use in loading and unloading into a cargo area of an emergency response vehicle, the patient transport apparatus comprising:

a base;

a support frame comprising a patient support surface configured to support a patient;

a lift mechanism interposed between the base and the support frame and being configured to move between a plurality of vertical configurations including an extended configuration and a retracted configuration, wherein the base and the support frame are separated by a first distance in the extended configuration and a second distance in the retracted configuration, and wherein the first distance is greater than the second distance;

a user interface configured for engagement by a user to generate a user input signal;

an object sensor configured to generate an object sensor signal corresponding to a presence of an object within an envelope defined as adjacent to the base; and a controller coupled to the lift mechanism, the user interface, and the object sensor, the controller being configured to:

determine if an object present within the envelope will come into contact with the base via the object sensor signal based on a distance between the object and the base and a speed of the object, drive the lift mechanism in response to receiving the user input signal, and interrupt driving of the lift mechanism between the extended configuration and the retracted configuration to stop motion of the lift mechanism in response to determining that the object present within the envelope will come into contact with the base.

18. A patient transport apparatus for use in loading and unloading into a cargo area of an emergency response vehicle, the patient transport apparatus comprising:

a base;

a support frame comprising a patient support surface configured to support a patient;

a lift mechanism interposed between the base and the support frame and being configured to move between a plurality of vertical configurations including an extended configuration and a retracted configuration, wherein the base and the support frame are separated by a first distance in the extended configuration and a second distance in the retracted configuration, and wherein the first distance is greater than the second distance;

a user interface configured for engagement by a user to generate a user input signal;

an object sensor configured to generate an object sensor signal corresponding to a presence of an object within an envelope defined as adjacent to the base; and a controller coupled to the lift mechanism, the user interface, and the object sensor, the controller being configured to:

determine if an object present within the envelope will come into contact with the base based on the object sensor signal, drive the lift mechanism in response to receiving the user input signal, interrupt driving of the lift mechanism between the extended configuration and the retracted configuration to stop motion of the lift mechanism in response to determining that the object present within the envelope will come into contact with the base, determine if the user input signal corresponds to a user override command, and drive the lift mechanism toward the extended configuration or the retracted configuration in response to determining that the user input signal corresponds to the user override command.

* * * * *